(12) United States Patent
Sakamoto et al.

(10) Patent No.: US 10,539,069 B2
(45) Date of Patent: Jan. 21, 2020

(54) VARIABLE NOZZLE MECHANISM AND VARIABLE GEOMETRY TURBOCHARGER

(71) Applicant: MITSUBISHI HEAVY INDUSTRIES ENGINE & TURBOCHARGER, LTD., Sagamihara-shi, Kanagawa (JP)

(72) Inventors: Keigo Sakamoto, Tokyo (JP); Yosuke Dammoto, Tokyo (JP); Eigo Katou, Tokyo (JP); Yoji Akiyama, Tokyo (JP); Shigeyoshi Sakuma, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 89 days.

(21) Appl. No.: 15/576,951

(22) PCT Filed: Dec. 25, 2015

(86) PCT No.: PCT/JP2015/086421
§ 371 (c)(1),
(2) Date: Nov. 27, 2017

(87) PCT Pub. No.: WO2017/109995
PCT Pub. Date: Jun. 29, 2017

(65) Prior Publication Data
US 2018/0149078 A1 May 31, 2018

(51) Int. Cl.
*F04D 29/46* (2006.01)
*F02B 37/24* (2006.01)
*F01D 17/16* (2006.01)

(52) U.S. Cl.
CPC ............ *F02B 37/24* (2013.01); *F01D 17/165* (2013.01); *F05D 2220/40* (2013.01)

(58) Field of Classification Search
CPC ........ F02B 37/22; F02B 37/225; F02B 37/24; F01D 17/165; F01D 17/167;
(Continued)

(56) References Cited

U.S. PATENT DOCUMENTS 7,559,199 B2 * 7/2009 Sausse ................. F01D 17/165
415/159
2010/0104433 A1  4/2010 Shi et al.
(Continued)

FOREIGN PATENT DOCUMENTS

EP        2180159 A1    4/2010
JP   2008-184971 A      8/2008
(Continued)

OTHER PUBLICATIONS

Extended European Search Report dated Apr. 9, 2018, issued in the corresponding EP Application No. 15911429.7.
(Continued)

*Primary Examiner* — Dwayne J White
*Assistant Examiner* — Danielle M. Christensen
(74) *Attorney, Agent, or Firm* — Birch, Stewart, Kolasch & Birch, LLP

(57) ABSTRACT

An inner peripheral edge of a first annular member includes a plurality of first inner edge portions belonging to an angular range in which support holes exist in the circumferential direction of a turbine rotor and a plurality of second inner edge portions belonging to an angular range in which the support holes do not exist in the circumferential direction of the turbine rotor. At least one second inner edge portion of the plurality of second inner edge portions comprises a recess portion recessed outward in a radial direction of the turbine rotor, the recess portion extending in an axial direction of the turbine rotor from the side of exhaust gas.

14 Claims, 22 Drawing Sheets

(58) Field of Classification Search
CPC .... F04D 27/002; F04D 27/0246; F04D 29/46; F04D 29/462; F04D 29/466; F05D 2240/128
See application file for complete search history.

(56) References Cited

U.S. PATENT DOCUMENTS

2010/0202874 A1    8/2010  Hayashi et al.
2014/0341761 A1*  11/2014  Severin ................ F01D 17/165
                                                            417/409

FOREIGN PATENT DOCUMENTS

| JP | 2009-144615 A | 7/2009 |
| JP | 2015-34470 A | 2/2015 |
| JP | 2015-63944 A | 4/2015 |
| WO | WO 2008/036862 A2 | 3/2008 |

OTHER PUBLICATIONS

English Translation of Written Opinion of the International Searching Authority of PCT/JP2015/086421 dated Feb. 9, 2016.
International Search Report of PCT/JP2015/086421 dated Feb. 9, 2016.

* cited by examiner

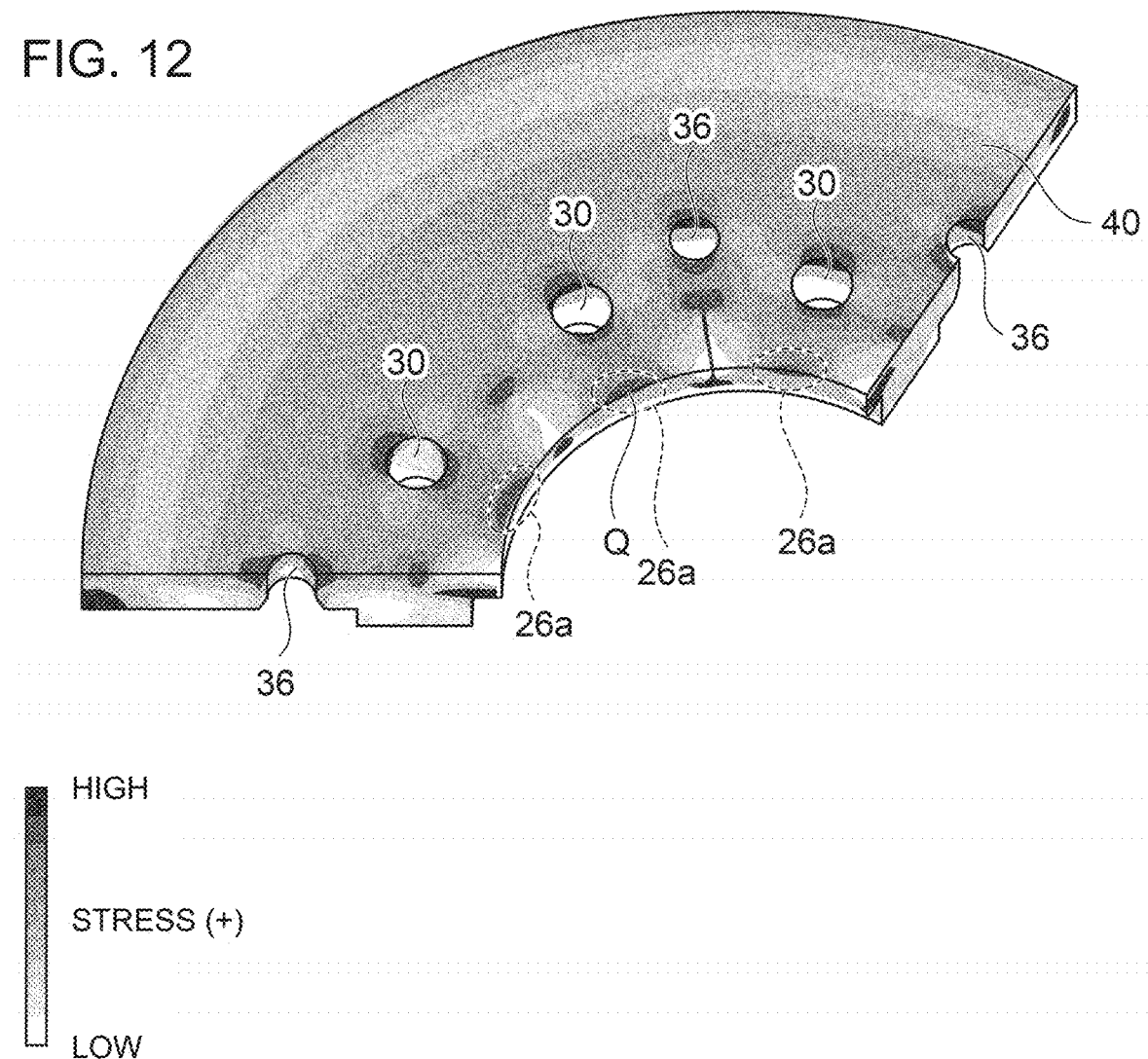

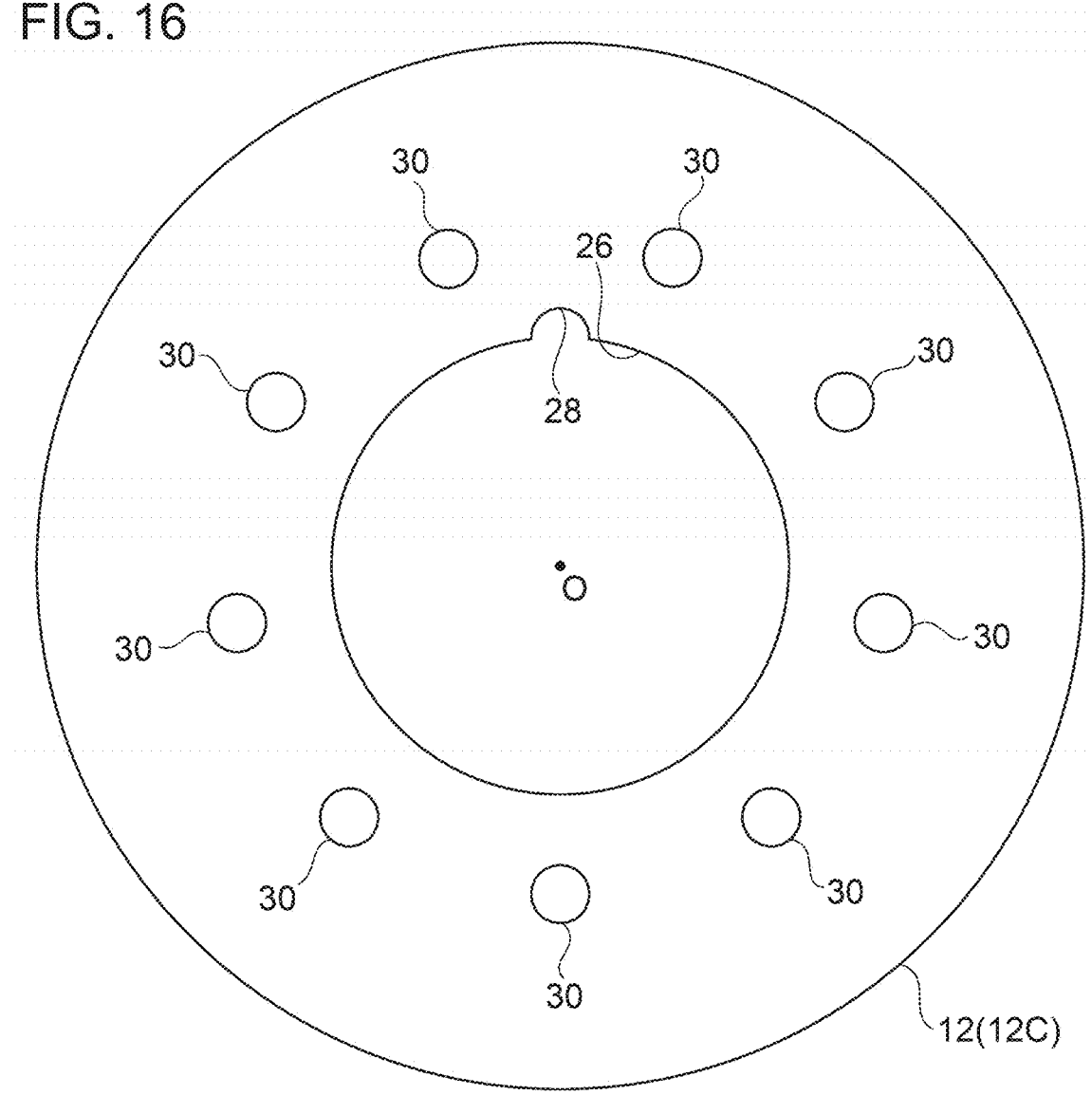

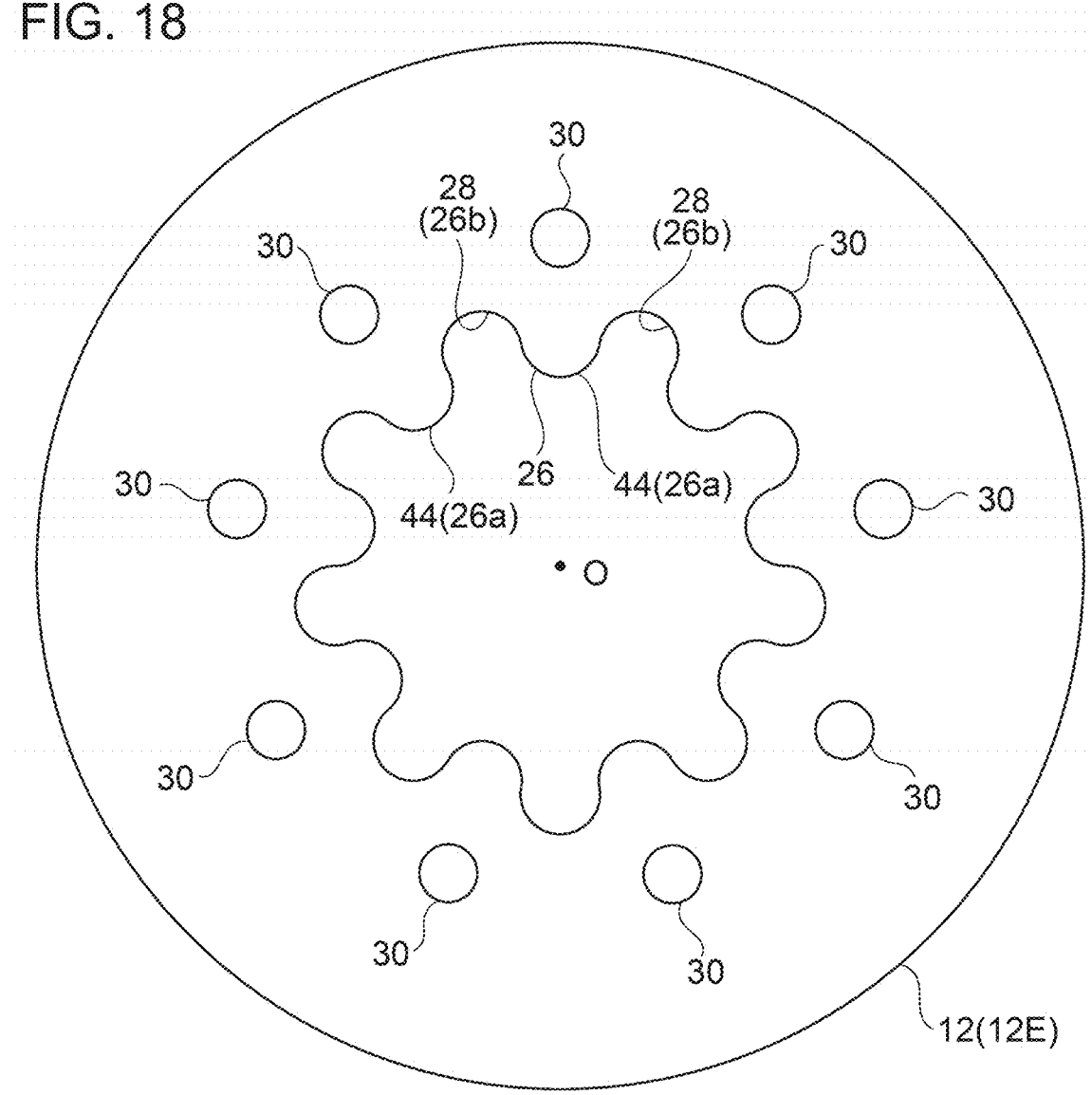

VARIABLE NOZZLE MECHANISM AND VARIABLE GEOMETRY TURBOCHARGER

TECHNICAL FIELD

The present disclosure relates to a variable nozzle mechanism and a variable geometry turbocharger.

BACKGROUND ART

The variable nozzle mechanism of the variable geometry turbocharger is for adjusting the flow passage area of exhaust gas inside a turbine casing to change the flow velocity and the pressure of exhaust gas to turbine blades, so as to enhance the effect of supercharging.

As shown in FIG. 19, the variable nozzle mechanism normally includes: a first annular member 012; a second annular member 14 disposed so as to face the first annular member and forming an annular exhaust gas flow passage 24 for guiding exhaust gas from a scroll flow passage 10 formed on the radially outer side of a turbine rotor 2 of the turbocharger to the turbine rotor between the first annular member and the second annular member; and a plurality of nozzle vanes 16 disposed between the first annular member and the second annular member so as to be rotatable and capable of adjusting the flow passage area of the exhaust gas flow passage.

Patent Document 1 discloses a turbocharger comprising a variable nozzle mechanism, wherein an annular partition wall member for partitioning a scroll flow passage and a link chamber is disposed around a nozzle ring (corresponding to the above first annular member). The annular partition wall member is formed of a member separate from a turbine housing, for preventing cracks formed on the partition wall member from reaching the turbine housing.

CITATION LIST

Patent Literature

Patent Document 1: JP2015-34470A

SUMMARY

Problems to be Solved

Meanwhile, the first annular member 012 of the variable nozzle mechanism is exposed to high-temperature exhaust gas flowing through the exhaust gas flow passage 24, and thus the temperature distribution and the thermal stress distribution of the first annular member 012 change due to the change in the temperature and the flow rate of exhaust gas flowing through the exhaust gas flow passage 24 that accompanies output variation of the engine.

The present inventors analyzed variation of the metal temperature and the stress of an inner peripheral edge 026 of the first annular member 012 in a period from heating transition to cooling transition of the first annular member 012. FIGS. 20 and 21 show the analysis result.

FIG. 20 is a diagram showing an example of stress distribution of the inner peripheral edge 026 of the first annular member 012 at the time of cooling transition of the first annular member 012. FIG. 21 is a diagram showing an example of variation of the metal temperature and the stress, at location Q, of the inner peripheral edge 026 in FIG. 20.

As shown in FIGS. 20 and 21, on heating transition and cooling transition of the first annular member 012, high thermal stress is generated in the inner peripheral edge 026 of the first annular member 012, due to the unevenness in the temperature distribution of the first annular member 012. Thus, repetitive generation of such thermal stress may lead to formation and development of thermal fatigue cracks from the inner peripheral edge 026 of the first annular member 012. Furthermore, in a case where a plurality of support holes 30 for supporting a plurality of nozzle vanes 16 are disposed on the first annular member 012, a penetration crack Cr may be formed as shown in FIG. 22, penetrating through the first annular member 012 from the inner peripheral edge 026 to a support hole 30. Such a penetration crack Cr may affect the rotational movement of the nozzle vanes 16 and the gas flow of the exhaust gas flow passage 24.

In particular, the exhaust gas temperature of a turbocharger for a gasoline engine rises higher than that of a diesel engine, and thus thermal stress is more likely to increase, and thermal fatigue cracks are more likely to occur.

Furthermore, forming the first annular member 012 of nickel-based alloy having a high-temperature fatigue strength to restrict generation of thermal fatigue cracks may increase the costs and reduce the price competitiveness of the product.

In this regard, Patent Document 1 does not disclose any configuration for suppressing generation of fatigue damage in the vicinity of the inner peripheral edge of the first annular member, and does not even disclose the problem of generation of fatigue damage in the vicinity of the inner peripheral edge.

The present invention was made in view of the above described typical problem, and an object is to provide a variable nozzle mechanism capable of suppressing generation of fatigue cracks that penetrate from an inner peripheral edge to a support hole, for a first annular member forming an exhaust gas flow passage in a variable nozzle mechanism, and a variable geometry turbocharger having the same.

Solution to the Problems (1) A variable nozzle mechanism for a variable geometry turbocharger according to at least one embodiment of the present invention comprises: a first annular member; a second annular member disposed so as to face the first annular member and forming an exhaust gas flow passage having an annular shape between the first annular member and the second annular member, for guiding exhaust gas to a turbine rotor of the turbo charger from a scroll flow passage formed on a radially outer side of the turbine rotor; and a plurality of nozzle vanes supported rotatably on the first annular member and configured to be capable of adjusting a flow passage area of the exhaust gas flow passage. The first annular member has a plurality of support holes for supporting the plurality of nozzle vanes rotatably, the support holes being disposed at intervals in a circumferential direction of the turbine rotor. An inner peripheral edge of the first annular member includes a plurality of first inner edge portions belonging to an angular range in which the support holes exist in the circumferential direction of the turbine rotor and a plurality of second inner edge portions belonging to an angular range in which the support holes do not exist in the circumferential direction of the turbine rotor. At least one second inner edge portion of the plurality of second inner edge portions comprises a recess portion recessed outward in a radial direction of the turbine rotor, the recess portion extending in an axial direction of the turbine rotor from the side of the exhaust gas flow passage.

With the variable nozzle mechanism described in the above (1), it is possible to concentrate stress to the recess portions formed on the second inner edge portions belonging to the angular range in which the support holes do not exist, and thus it is possible to reduce thermal stress generated in the first inner edge portions belonging to the angular range in which the support holes exist. Accordingly, it is possible to suppress generation of such a fatigue crack that penetrates from the inner peripheral edge to a support hole.

(2) In some embodiments, in the above variable nozzle mechanism (1), the recess portion is formed at a center position of the angular range in which the support holes do not exist in the circumferential direction of the turbine rotor.

With the variable nozzle mechanism described in the above (2), the recess portion, to which the stress concentrates, is formed at a position away from the support holes, and thus it is possible to reduce thermal stress effectively at the first inner edge portions belonging to the angular range in which the support holes exist. Accordingly, it is possible to suppress generation of such a fatigue crack that penetrates from the inner peripheral edge to a support hole effectively.

(3) In some embodiments, in the variable nozzle mechanism (1) or (2), the recess portion is formed to have an arc shape as seen in the axial direction of the turbine rotor.

With the variable nozzle mechanism described in the above (3), stress is generated in a relatively uniform manner inside the recess portion having an arc shape, and thus it is possible to suppress generation of a crack from the recess portion. Furthermore, the recess portion having such an arc shape can be formed by machining, plastic forming, casting, or the like.

(4) In some embodiments, in the variable nozzle mechanism (1) or (2), the recess portion is formed to have a linear shape as seen in the axial direction of the turbine rotor.

While the recess portion described in the above (4) can be formed by machining, plastic forming, casting, or the like, the recess portion can be formed easily by machining in particular, for instance.

(5) In some embodiments, in the variable nozzle mechanism according to any one of claims (1) to (4), the inner peripheral edge has an annular protruding portion protruding inward in the radial direction of the turbine rotor, on the side of the exhaust gas flow passage, and the recess portion is formed on the annular protruding portion.

With the above variable nozzle mechanism described in the above (5), in a case where the inner peripheral edge has an annular protruding portion (e.g. an annular protruding portion for holding a back plate that prevents a leakage flow of exhaust gas), the thickness of the annular protruding portion is likely to be thin in the axial direction of the turbine rotor, but providing the above recess portion on the annular protruding portion makes it possible to suppress generation of the above fatigue crack on the annular protruding portion effectively.

(6) In some embodiments, in the above variable nozzle mechanism (5), the recess portion is formed over a range of not less than 60% of a thickness of the annular protruding portion in the axial direction of the turbine rotor.

With the variable nozzle mechanism described in the above (6), it is possible to reduce the stress range considerably and to extend the fatigue lifetime at the first inner edge portion belonging to the angular range in which the support holes exist.

(7) In some embodiments, in the variable nozzle mechanism according to the above (1) to (6), the recess portion is formed so as to penetrate through the first annular member in the axial direction of the turbine rotor.

With the above configuration (7), it is possible to suppress generation of such a fatigue crack that penetrates from the inner peripheral edge to a support hole with a simple configuration. Such a recess portion can be formed by machining, plastic forming, casting, or the like.

(8) In some embodiments, in the variable nozzle mechanism according to any one of the above (1) to (7), of the inner peripheral edge, a connection portion between a surface of the first annular member facing the second annular member and an inner peripheral surface of the first annular member has an R shape in an angular range in which the recess portion does not exist in the circumferential direction of the turbine rotor.

With the variable nozzle mechanism described in the above (8), it is possible to reduce stress generated in a portion belonging to the angular range of the inner peripheral edge where the recess portion does not exist by providing the R shape, and thus it is possible to suppress generation of a fatigue crack from the inner peripheral edge.

(9) In some embodiments, in the variable nozzle mechanism according to any one of the above (1) to (8), each of the plurality of second inner edge portions has a recess portion formed thereon, the recess portion being recessed outward in the radial direction of the turbine rotor.

With the variable nozzle mechanism described in the above (9) having such a configuration, it is possible to reduce thermal stress in all of the first inner edge portions, and to suppress generation of such a fatigue crack that penetrates from the inner peripheral edge to a support hole.

(10) In some embodiments, in the variable nozzle mechanism according to (1) or (2), the inner peripheral edge has recess portions curved so as to be recessed outward in the radial direction of the turbine rotor and protruding portions connecting to the curved recess portions smoothly and curved so as to protrude inward in the radial direction of the turbine rotor, the recess portions and the protruding portions being formed alternately, and each of the second inner edge portions has one of the recess portions.

With the variable nozzle mechanism described in the above (10) having such a configuration, it is possible to reduce thermal stress in all of the first inner edge portions, and to suppress generation of such a fatigue crack that penetrates from the inner peripheral edge to a support hole effectively. Furthermore, since the recess portions curved so as to be recessed outward in the radial direction and the protruding portions curved so as to protrude inward in the radial direction are connected smoothly, the connection between the recess portions and parts other than the recess portions is not structurally weak, but has a high durability. The first annular member having such a shape can be easily produced by casting, for instance.

(11) A variable geometry turbocharger according to at least one embodiment of the present invention comprises: a turbine rotor; a turbine casing housing the turbine rotor and forming a scroll flow passage into which exhaust gas from an engine flows; and the variable nozzle mechanism according to any one of the above (1) to (10). Exhaust gas passes through the scroll flow passage and then is supplied to the turbine rotor via the variable nozzle mechanism.

With the variable geometry turbocharger described in the above (11), generation of such a fatigue crack that penetrates through from the inner peripheral edge to a support hole is suppressed, and thus it is possible to reduce efforts and time required to perform maintenance such as repair and replacement of the first annular member.

Advantageous Effects

According to at least one embodiment of the present invention, provided is a variable nozzle mechanism capable of suppressing generation of fatigue cracks that penetrate from an inner peripheral edge to a support hole, for a first annular member forming an exhaust gas flow passage in a variable nozzle mechanism, and a variable geometry turbocharger having the same.

BRIEF DESCRIPTION OF DRAWINGS

FIG. 12 is a stress distribution diagram showing an example of thermal stress generated in the first annular member 12 (12B) on cooling transition (e.g. when the exhaust gas temperature and the exhaust gas flow rate of the exhaust gas flow passage 24 decrease due to a decrease in the engine output).

FIG. 16 is a diagram of a first annular member 12 (12C) according to an embodiment, as seen in the axial direction of a turbine rotor 2 from the side of an exhaust gas flow passage 24.

FIG. 18 is a diagram of the first annular member 12 (12E) according to an embodiment, as seen in the axial direction of a turbine rotor 2 from the side of an exhaust gas flow passage 24.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
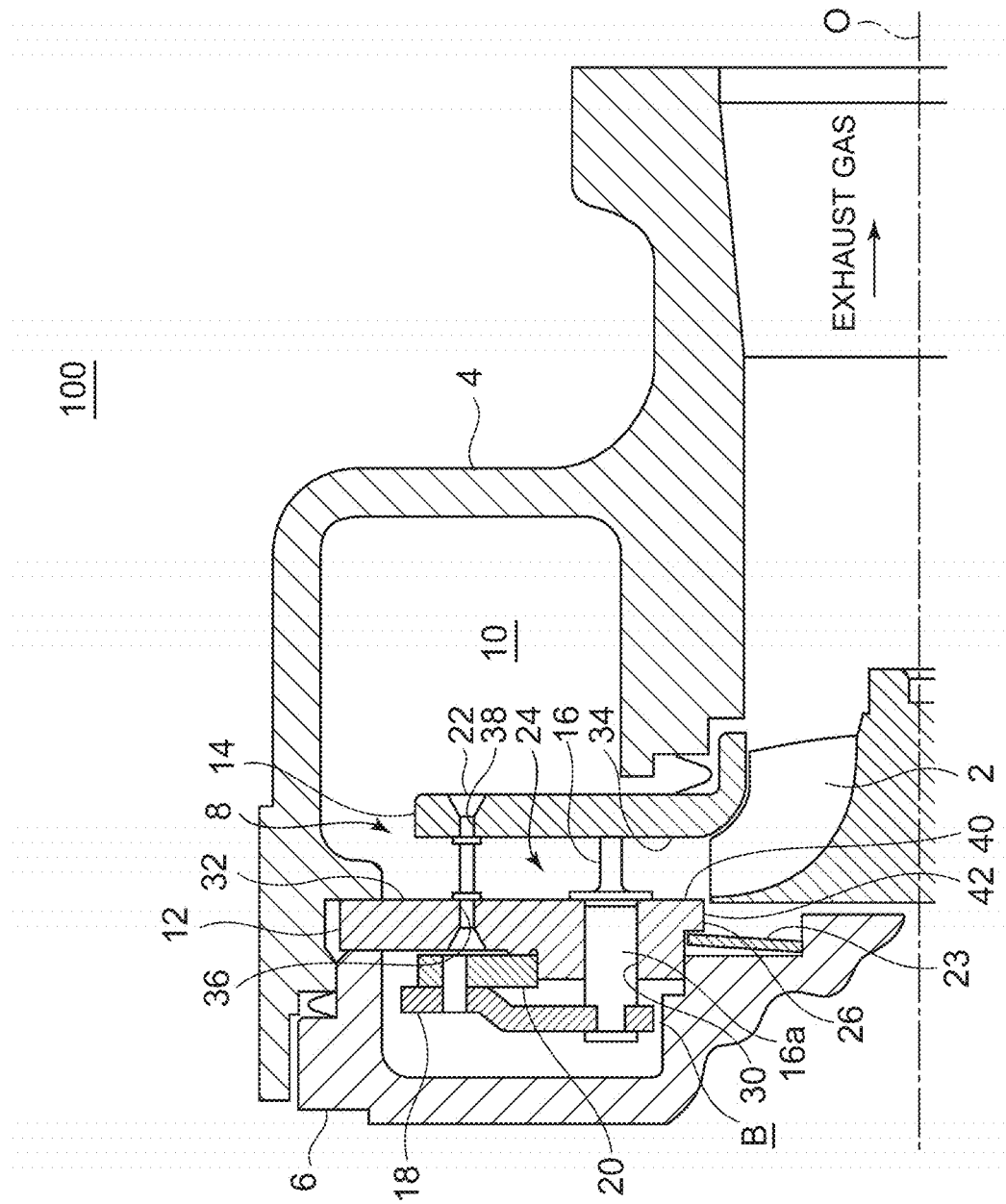
FIG. 1 is a partial schematic diagram of a cross section, taken along a rotational axis, of a variable geometry turbocharger 100 according to an embodiment of the present invention.

FIG. 1 is a partial schematic diagram of a cross section, taken along a rotational axis O, of a variable geometry turbocharger 100 according to an embodiment of the present invention.

The variable geometry turbocharger 100 includes a turbine rotor 2 disposed coaxially with a non-depicted compressor, a turbine casing 4 that houses the turbine rotor 2, a bearing casing 6 that houses a non-depicted bearing supporting the turbine rotor 2 rotatably, and a variable nozzle mechanism 8 disposed between the turbine casing 4 and the bearing casing 6.

The turbine casing 4 has a scroll flow passage 10 formed on the radially outer side of the turbine rotor 2, and exhaust gas from a non-depicted engine is supplied to the turbine rotor 2 via the variable nozzle mechanism 8 after passing through the scroll flow passage 10.

The variable nozzle mechanism 8 includes a first annular member 12 (nozzle mount), a second annular member 14 (nozzle plate), a plurality of nozzle vanes 16, a plurality of lever plates 18, a drive ring 20, a plurality of nozzle supports 22, and a back plate 23.

The first annular member 12 is an annular plate disposed on the radially outer side of the turbine rotor 2, and is configured to support the plurality of nozzle vanes 16 rotatably. The first annular member 12 has a plurality of support holes 30 (through holes) for supporting respective shaft portions 16*a* of the plurality of nozzle vanes 16 rotatably. The plurality of support holes 30 are disposed at intervals in the circumferential direction of the turbine rotor 2.

The second annular member 14 is an annular plate disposed so as to face the first annular member 12, and is configured to form an exhaust gas flow passage 24 having an annular shape between the first annular member 12 and the second annular member 14, for guiding exhaust gas from the scroll flow passage 10 to the turbine rotor 2.

The first annular member 12 constitutes a hub-side wall 32 of the exhaust gas flow passage 24, while the second annular member 14 constitutes a shroud-side wall 34 of the exhaust gas flow passage 24. The first end side of the nozzle support 22 is inserted through a through hole 36 formed on the first annular member 12. The second end side of the nozzle support 22 is inserted through a through hole 38 formed on the second annular member 14. The first annular member 12 and the second annular member 14 are coupled by the plurality of nozzle supports 22.

The inner peripheral edge 26 of the first annular member 12 has, on the side of the exhaust gas flow passage 24, an annular protruding portion 42 protruding inward in the radial direction of the turbine rotor 2. A back plate 23 is disposed between the back face of the turbine rotor 2 and the bearing casing 6, so that exhaust gas flowing from the exhaust gas flow passage 24 to the turbine rotor 2 does not leak toward the back side of the first annular member 12 (opposite to the exhaust gas flow passage 24) through the radially inner side of the first annular member 12. The back plate 23 is in contact with the annular protruding portion 42 at one end side in the axial direction, and is in contact with the bearing casing 6 at the other end side in the axial direction.

The plurality of nozzle vanes 16 are disposed between the first annular member 12 and the second annular member 14, and supported rotatably in the support holes 30 of the first annular member 12. The variable nozzle mechanism 8 is configured to adjust the flow passage area of the exhaust gas flow passage 24 by changing the vane angle of the plurality of nozzle vanes 16.

In the variable nozzle mechanism 8 described above, the drive ring 20 is rotary driven by a driving force transmitted from a non-depicted actuator. When the drive ring 20 rotates, the lever plates 18 being in engagement with the drive ring 20 rotate the shaft portions 16*a* of the nozzle vanes 16, and as a result, the nozzle vanes 16 rotate to change the vane angle of the nozzle vanes 16.

Figure 2:
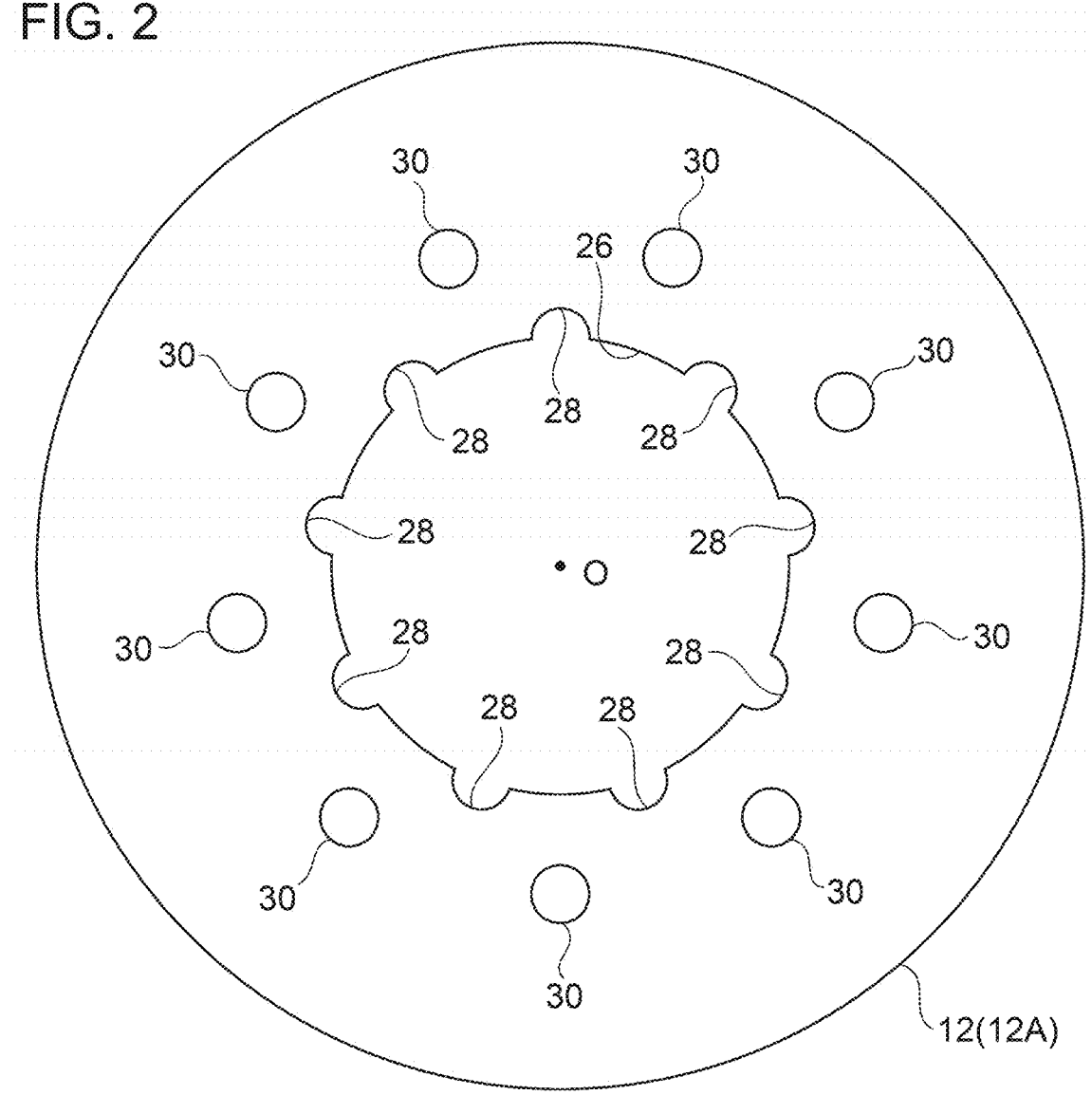
FIG. 2 is a diagram of the first annular member 12 (12A) according to an embodiment, as seen in the axial direction of a turbine rotor 2 from the side of an exhaust gas flow passage 24.
Figure 3:
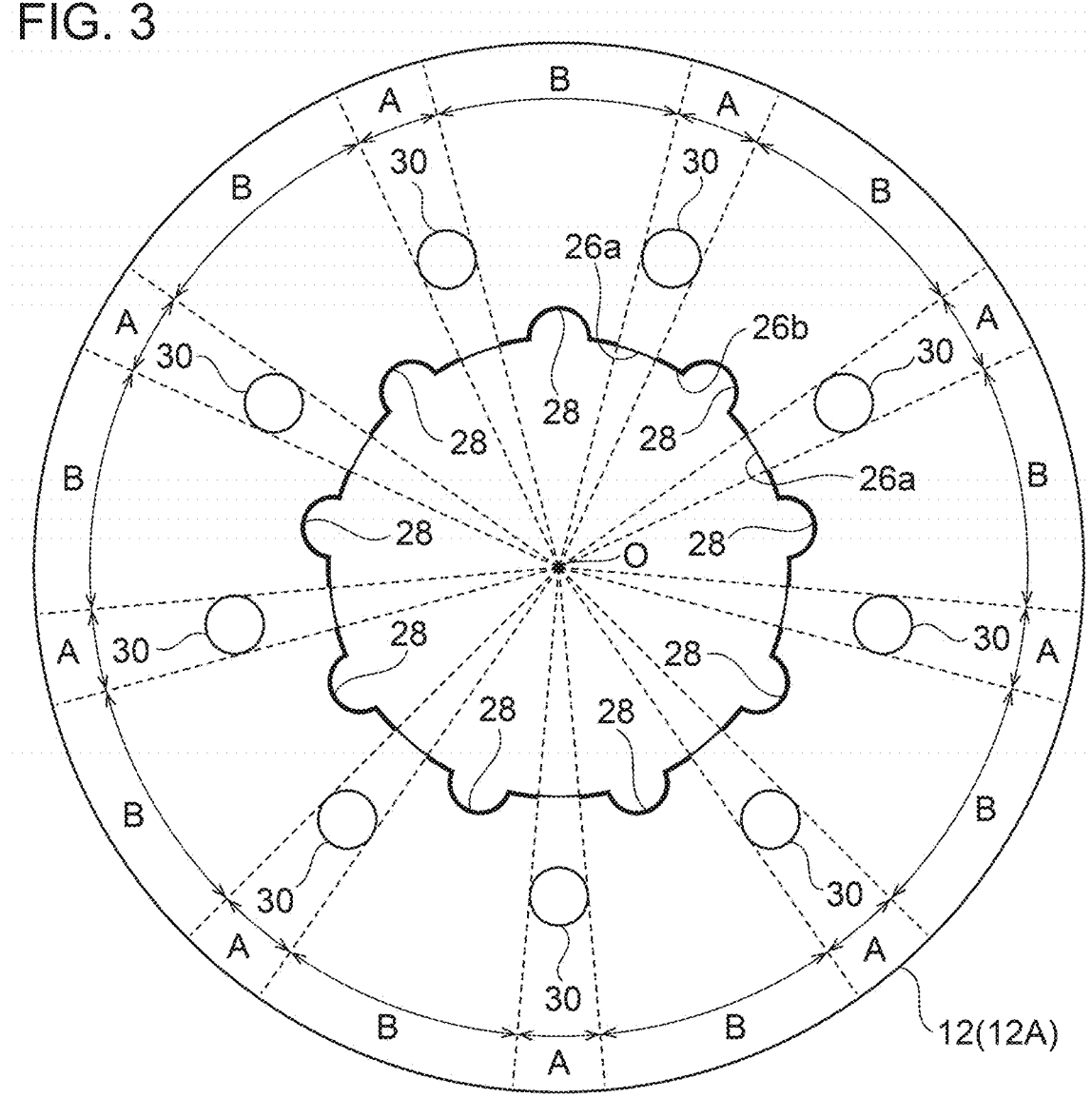
FIG. 3 is a diagram of the first annular member 12 (12A) according to an embodiment, as seen in the axial direction of a turbine rotor 2 from the side of an exhaust gas flow passage 24.
Figure 4:
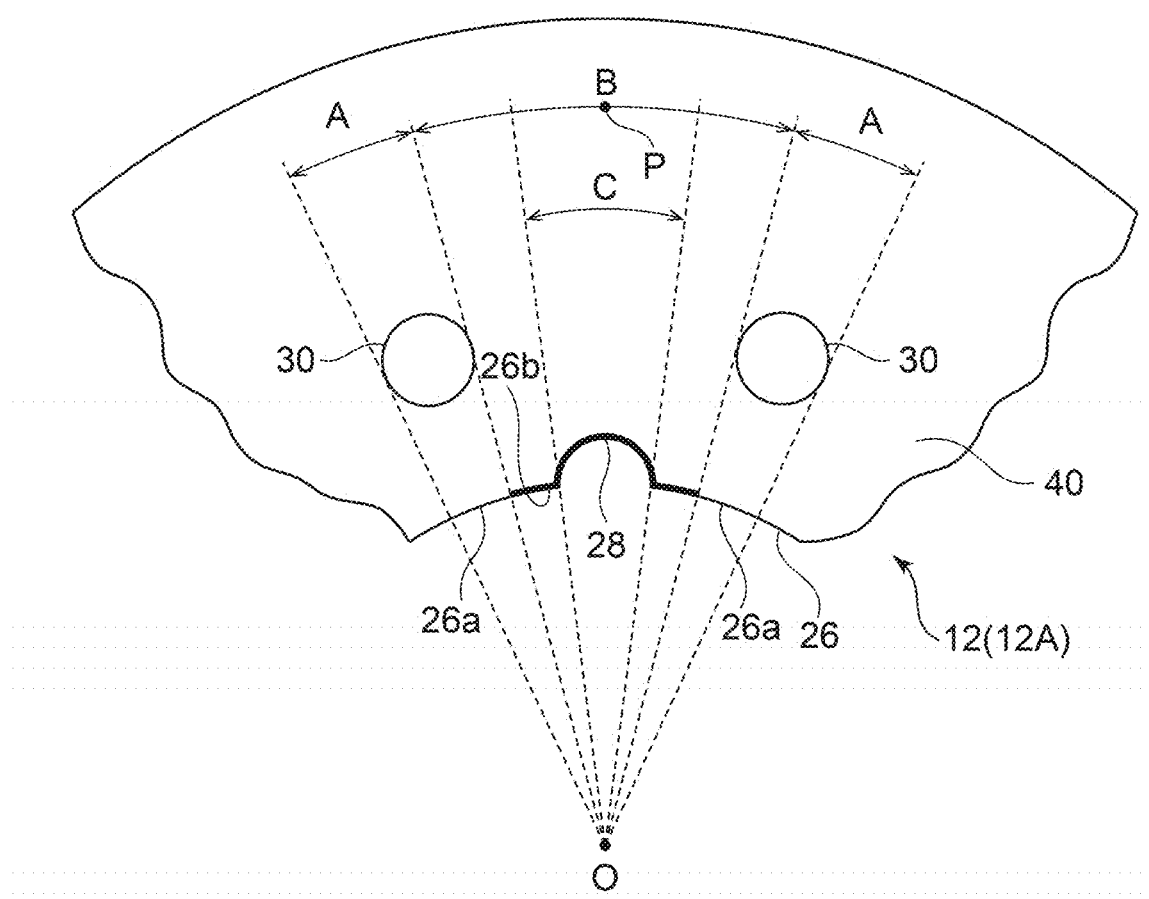
FIG. 4 is a partial enlarged view of the first annular member 12 (12A).
Figure 5:
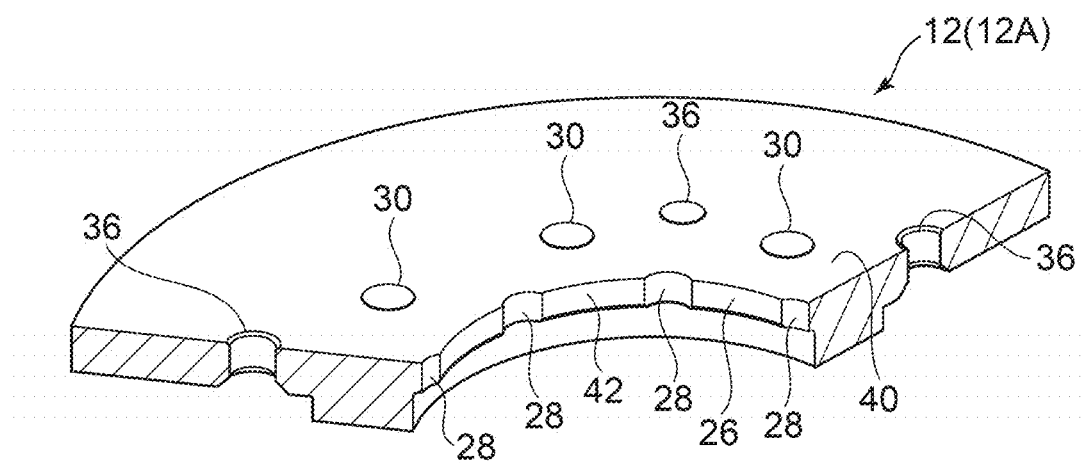
FIG. 5 is a partial perspective view of the first annular member 12 (12A).
Figure 6:
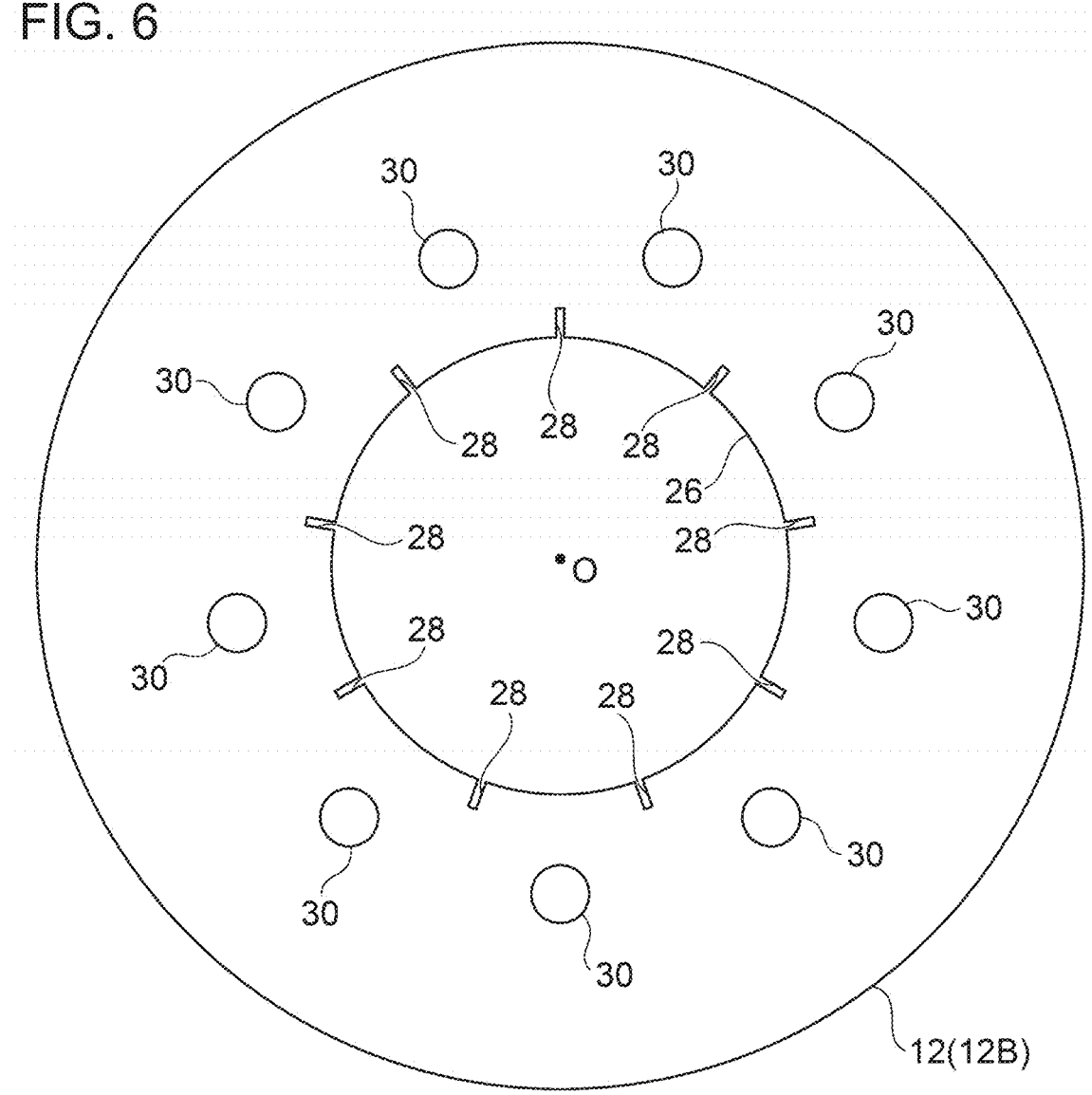
FIG. 6 is a diagram of the first annular member 12 (12B) according to an embodiment, as seen in the axial direction of a turbine rotor 2 from the side of an exhaust gas flow passage 24.
Figure 7:
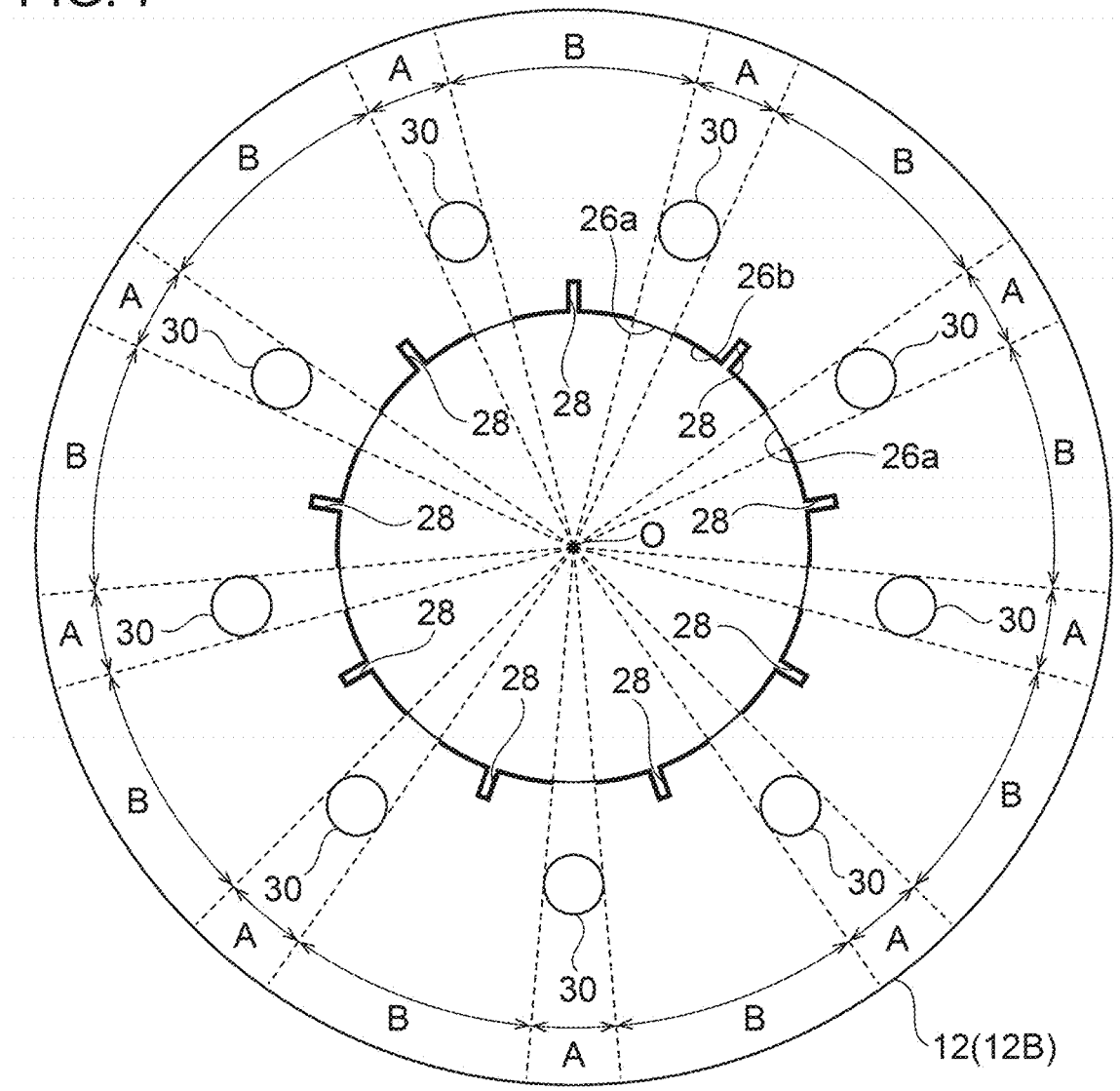
FIG. 7 is a diagram of the first annular member 12 (12B) according to an embodiment, as seen in the axial direction of a turbine rotor 2 from the side of an exhaust gas flow passage 24.
Figure 8:
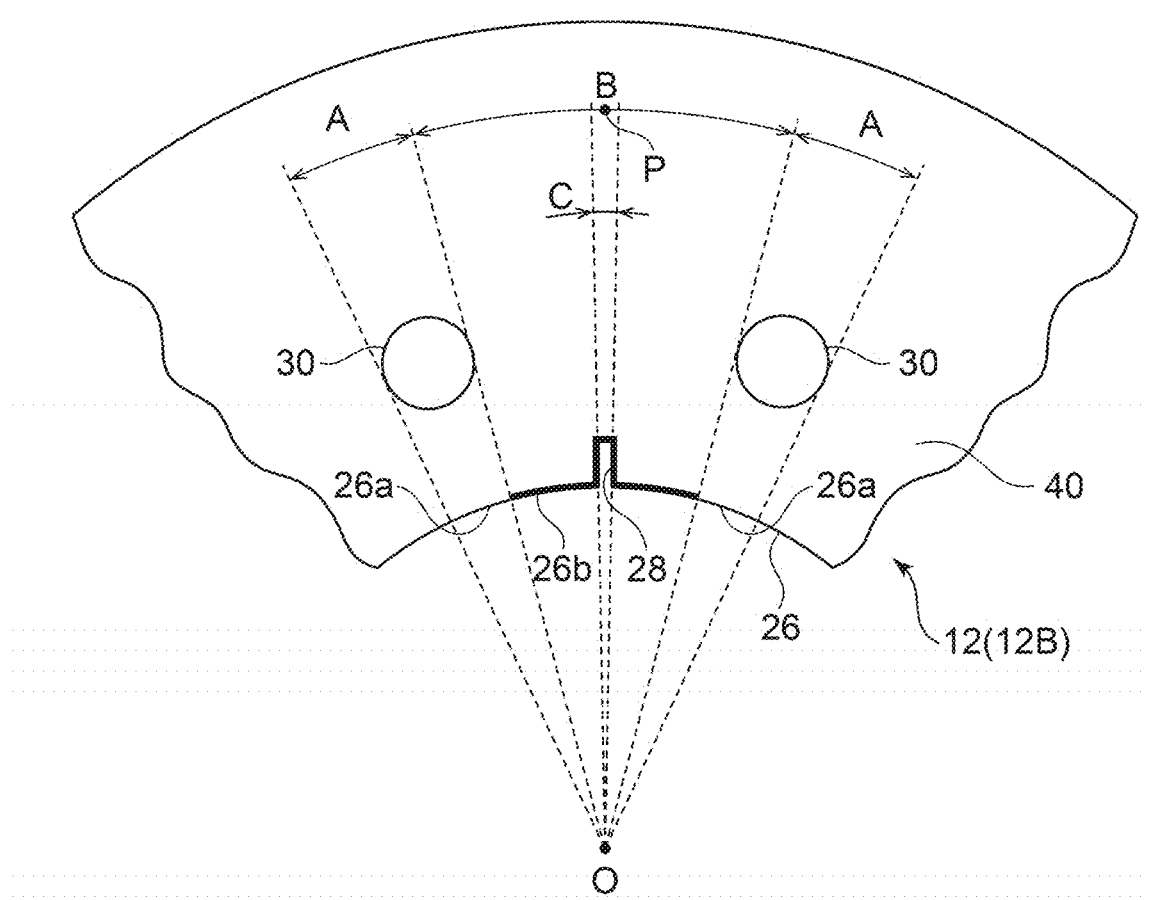
FIG. 8 is a partial enlarged view of the first annular member 12 (12A).
Figure 9:
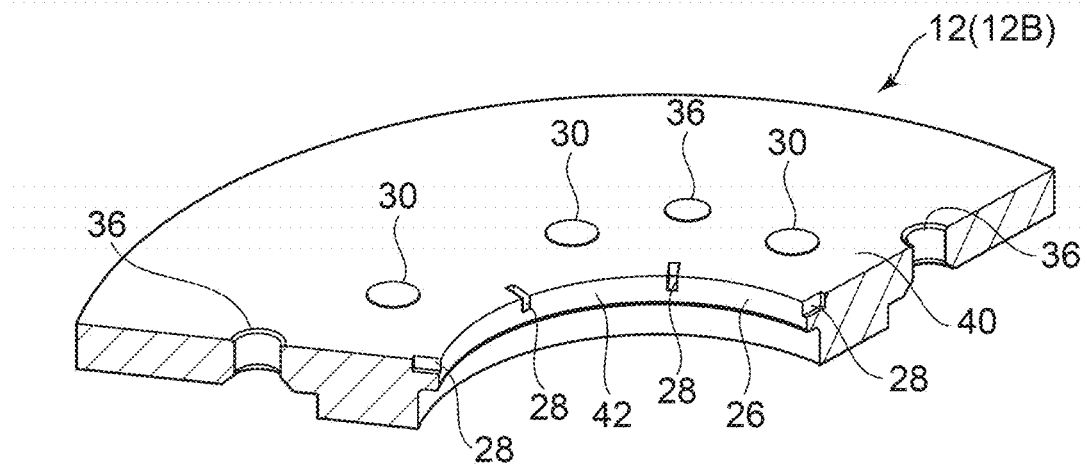
FIG. 9 is a partial perspective view of the first annular member 12 (12B).

FIG. 2 is a diagram of the first annular member 12 (12A) according to an embodiment, as seen in the axial direction of the turbine rotor 2 from the side of the exhaust gas flow passage 24. FIG. 3 is a diagram of the first annular member 12 (12A) according to an embodiment, as seen in the axial direction of the turbine rotor 2 from the side of the exhaust gas flow passage 24. FIG. 4 is a partial enlarged view of the first annular member 12 (12A). FIG. 5 is a partial perspective view of the first annular member 12 (12A). FIG. 6 is a diagram of the first annular member 12 (12B) according to an embodiment, as seen in the axial direction of the turbine rotor 2 from the side of the exhaust gas flow passage 24. FIG. 7 is a diagram of the first annular member 12 (12B) according to an embodiment, as seen in the axial direction of the turbine rotor 2 from the side of the exhaust gas flow passage 24. FIG. 8 is a partial enlarged view of the first annular member 12 (12A). FIG. 9 is a partial perspective view of the first annular member 12 (12B). In FIGS. 2, 3, 6, and 7, the above through holes 36, 38 are not shown for the sake of convenience.

In some embodiments, as shown in FIGS. 3 and 7 for instance, the inner peripheral edge 26 of the first annular member 12 (12A, 12B) comprises a plurality of first inner edge portions 26*a* belonging to the angular range A in which the support holes 30 exist in the circumferential direction of the turbine rotor 2, and a plurality of second inner edge portions 26*b* belonging to the angular range B in which the support holes 30 do not exist in the circumferential direction of the turbine rotor 2.

Furthermore, as shown in FIGS. 3 and 7 for instance, at least one second inner edge portion 26*b* (each of the plurality of second inner edge portions 26*b* in the exemplary embodiment shown in the drawings) among the plurality of second inner edge portions 26*b* has a recess portion 28 recessed outward in the radial direction of the turbine rotor 2. The recess portion 28 is disposed next to the exhaust gas flow passage 24, and extends in the axial direction of the turbine rotor 2 from the side of the exhaust gas flow passage 24.

With the above configuration, it is possible to concentrate stress to the recess portions 28 formed on the second inner edge portions 26*b* belonging to the angular range B in which the support holes 30 do not exist, and thus it is possible to reduce thermal stress generated in the first inner edge portions 26*a* belonging to the angular range A in which the support holes 30 exist as compared to a typical configuration in which the inner peripheral edges 26 do not have the recess portions 28. Accordingly, it is possible to suppress generation of such a fatigue crack that penetrates from the inner peripheral edge 26 to a support hole 30. Thus, in a case where the turbocharger 100 is a turbocharger for a gasoline engine, it is possible to suppress generation of such a fatigue crack that penetrates from the inner peripheral edge 26 to a support hole 30, even if the first annular member 12 is not made of Ni-based alloy but of stainless steel.

In an embodiment, as shown in FIGS. 2 to 5 for instance, each of the recess portions 28 is formed into an arc shape as seen in the axial direction of the turbine rotor 2. With such a configuration, stress is generated in a relatively uniform manner inside the recess portion 28 having an arc shape, and thus it is possible to suppress generation of a crack from the recess portion 28.

In an embodiment, as shown in FIGS. 6 to 9 for instance, each of the recess portions 28 is formed into a linear shape (rectangular shape) as seen in the axial direction of the turbine rotor 2. With such a configuration, the recess portions 28 can be formed easily by machining, for instance.

In some embodiments, as shown in FIGS. 4 and 8 for instance, each of the recess portions 28 is formed at the center position P of the angular range B in which the support holes 30 do not exist in the circumferential direction of the turbine rotor 2. That is, each of the recess portions 28 is formed at such a position that the angular range C in which the recess portions 28 exist in the circumferential direction of the turbine rotor 2 includes the center position of the angular range B in the circumferential direction of the turbine rotor 2.

With such a configuration, the recess portions 28 where the stress concentrates are formed at positions away from the support holes 30, and thus it is possible to reduce thermal stress effectively at the first inner edge portions 26a belonging to the angular range A in which the support holes 30 exist.

In some embodiments, as shown in FIGS. 1, 5, and 9 for instance, each of the recess portions 28 is formed on an annular protruding portion 42.

In a case where the inner peripheral edge 26 has an annular protruding portion 42 for providing the back plate 23 (see FIG. 1), the thickness of the annular protruding portion 42 in the axial direction of the turbine rotor 2 is likely to be thin. Also in this case, with the recess portions 28 disposed on the annular protruding portion 42, it is possible to suppress generation of such a fatigue crack that penetrates from the annular protruding portion 42 of the inner peripheral edge 26 to a support hole 30.

In an embodiment, as shown in FIG. 5 for instance, each of the recess portions 28 is formed so as to penetrate the annular protruding portion 42 of the first annular member 12 in the axial direction of the turbine rotor 2. With such a configuration, it is possible to suppress generation of such a fatigue crack that penetrates from the inner peripheral edge 26 to a support hole 30 with a simple configuration.

Figure 10:
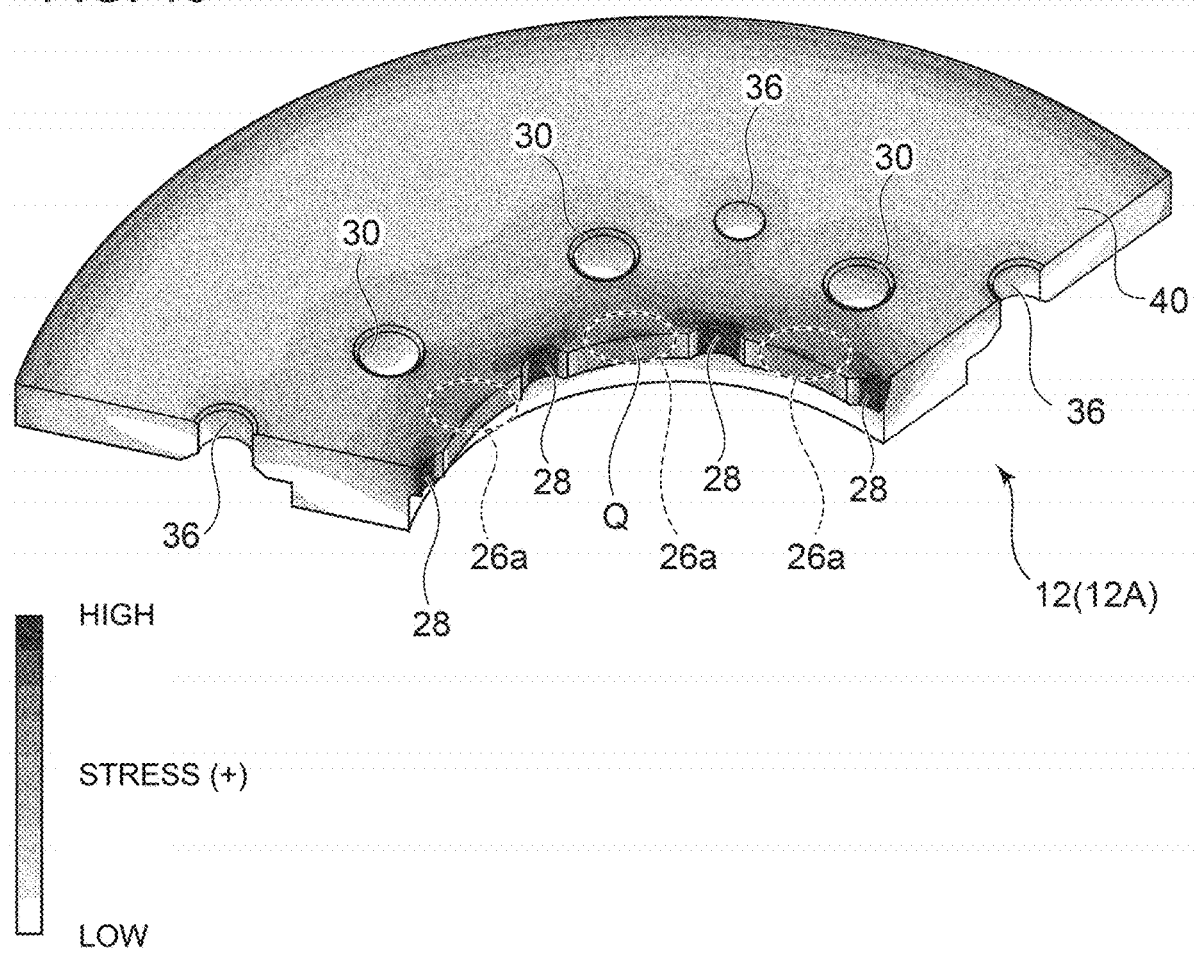
FIG. 10 is a stress distribution diagram showing an example of thermal stress generated in the first annular member 12 (12A) on cooling transition.

The result of analysis on thermal stress generated in the first annular member 12 (12A) during operation of the turbocharger 100 will now be described. FIG. 10 is a stress distribution diagram showing an example of thermal stress generated in the first annular member 12 (12A) on cooling transition of the first annular member 12 (12A) (e.g. when the exhaust gas temperature and the exhaust gas flow rate of the exhaust gas flow passage 24 decrease due to a decrease in the engine output).

Figure 21:
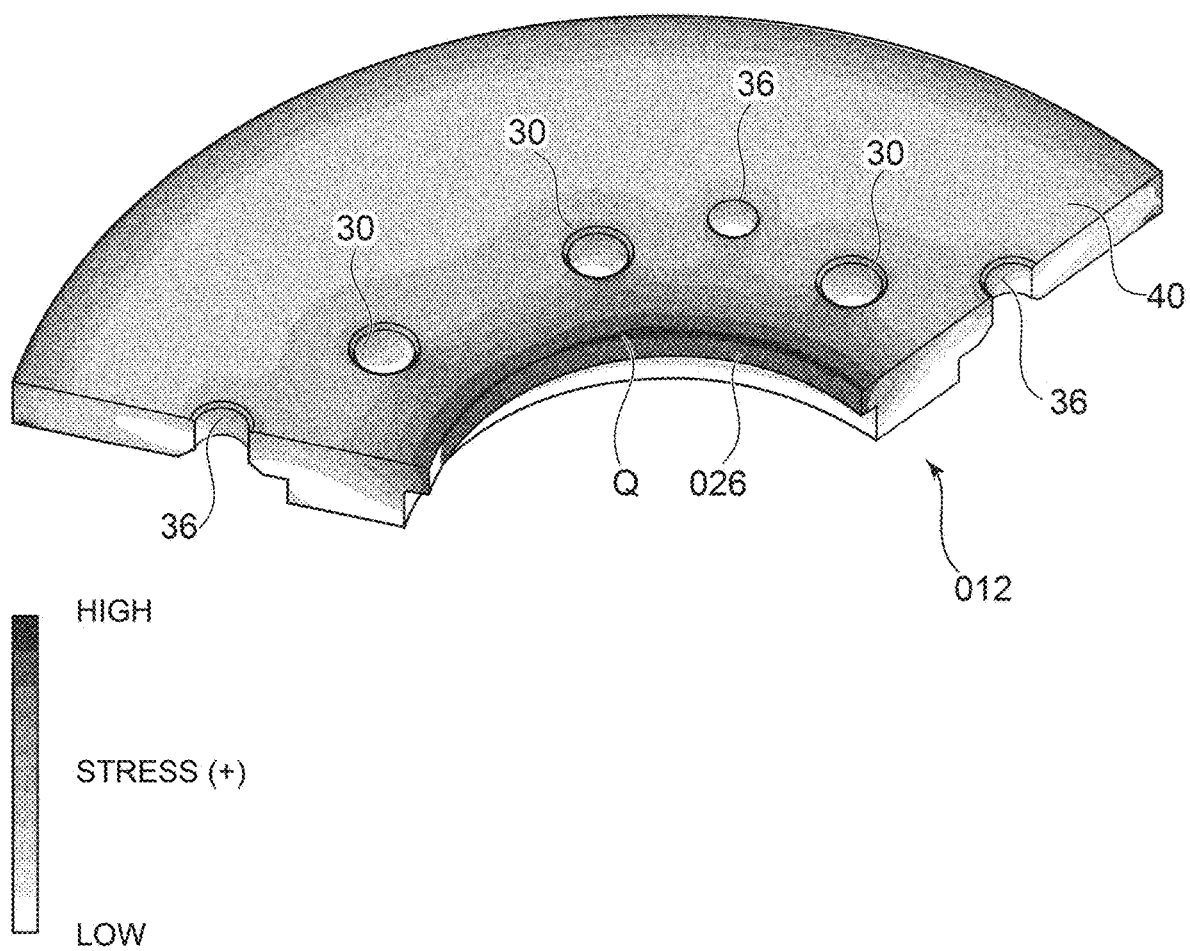
FIG. 21 is a diagram showing an example of variation of the metal temperature and the stress, at location Q, of the inner peripheral edge 026 in FIG. 20.
Figure 22:
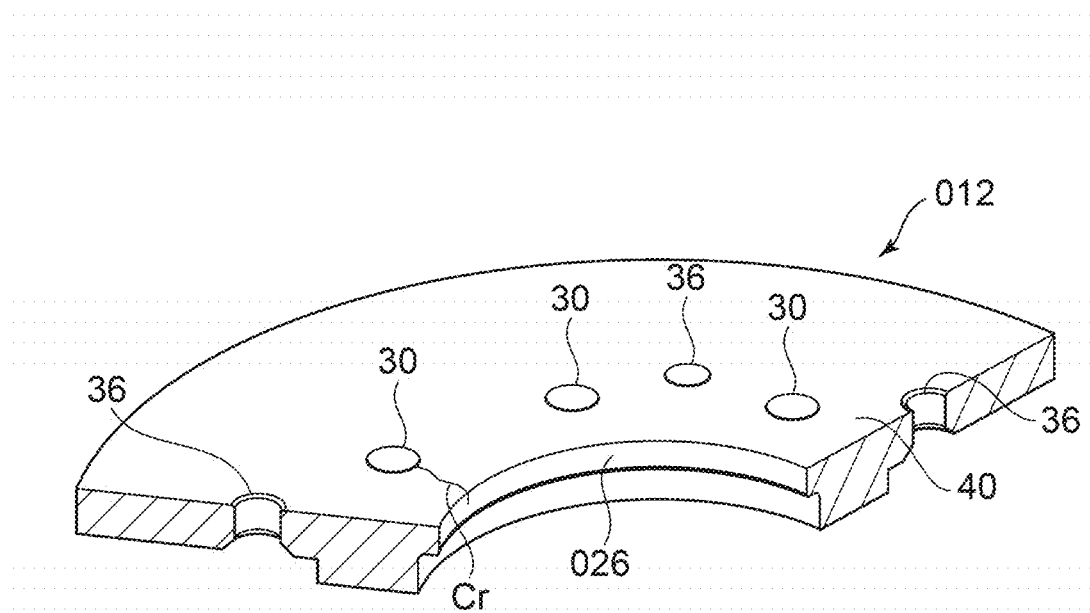
FIG. 22 is a diagram showing a penetration crack Cr penetrating through the first annular member 012 from an inner peripheral edge 026 to a support hole 30.

As shown in FIG. 10, stress concentrates to the recess portions 28 in the first annular member 12 (12A), and thus it is possible to reduce thermal stress in the first inner edge portions 26a in the angular range A (see FIG. 3) in which the support holes 30 exist, as compared to a typical example shown in FIG. 21 and the like (the first annular member 012 is not provided with the recess portions 28). Accordingly, it is possible to suppress generation of such a fatigue crack that penetrates from the inner peripheral edge 26 to a support hole 30.

Figure 11:
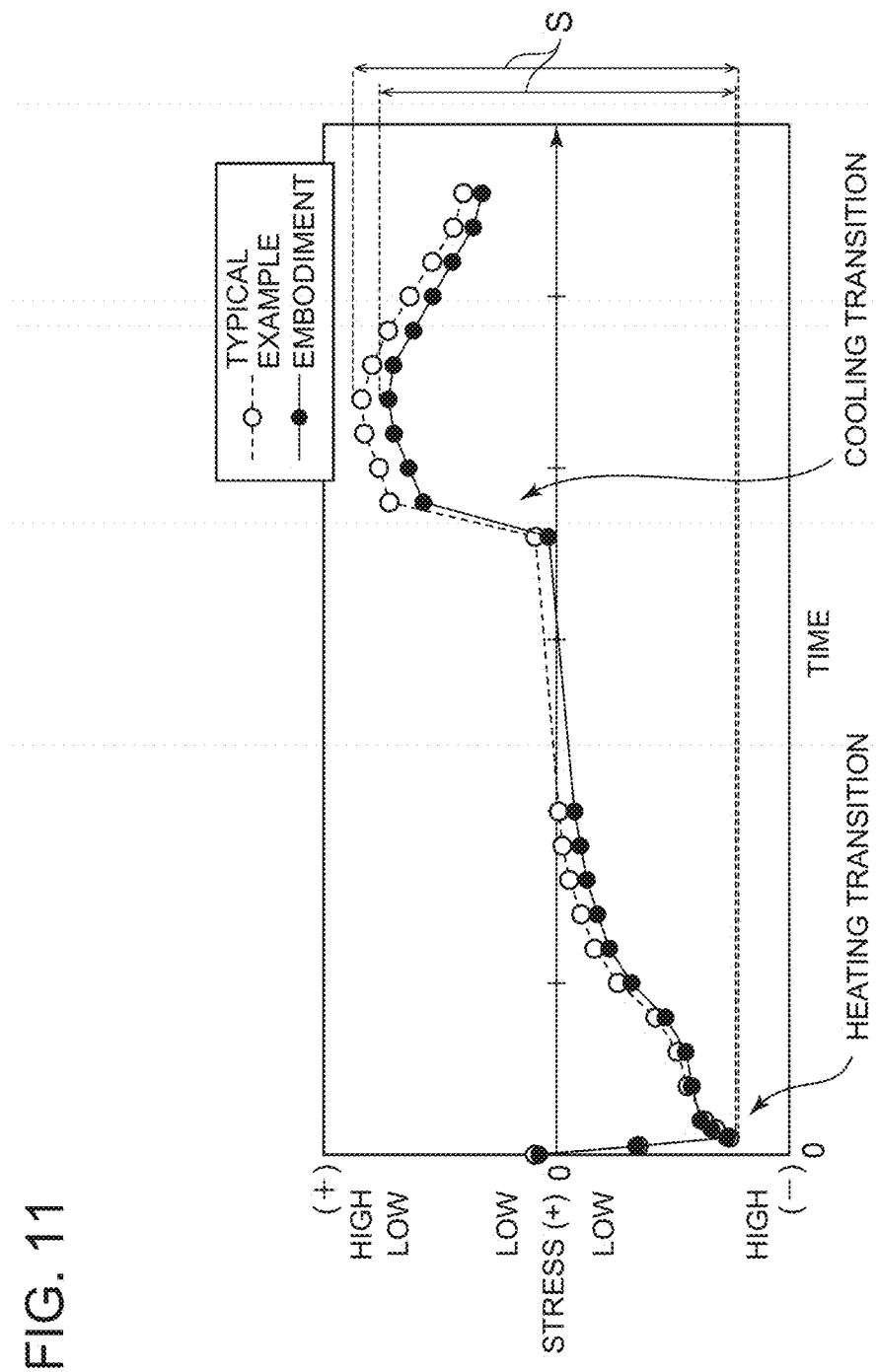
FIG. 11 is a stress history chart showing the temporal change of stress generated at the same location Q (see FIGS. 10 and 21) of the first inner edge portion 26 belonging to the angular range A, for a typical example (the first annular member 012 without the recess portion 28) and the embodiment (the first annular member 12 (12A) with the recess portion 28).
Figure 13A:
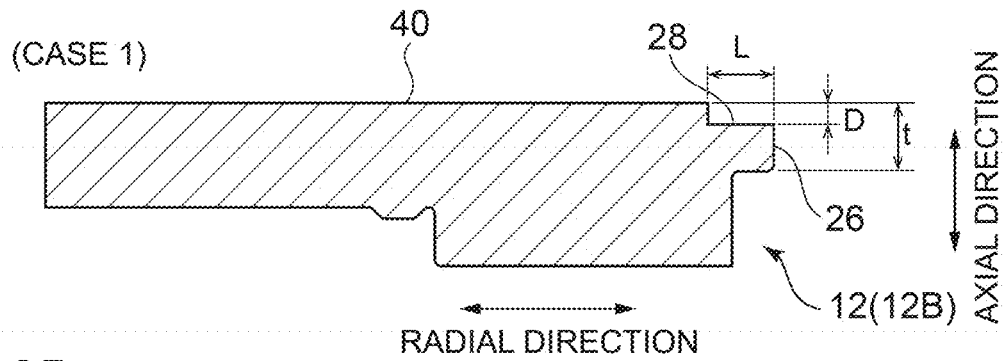
FIG. 13A is a cross-sectional view showing the formation range of a recess portion 28 of Case 1 on the first annular member 12 (12B).
Figure 13B:
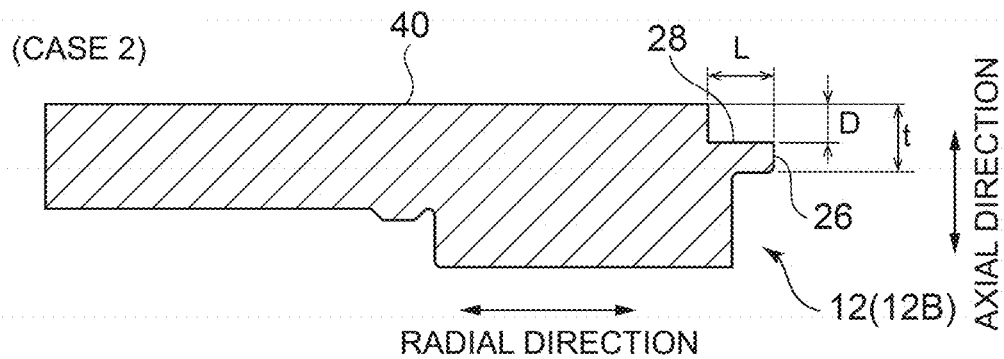
FIG. 13B is a cross-sectional view showing the formation range of a recess portion 28 of Case 2 on the first annular member 12 (12B).
Figure 13C:
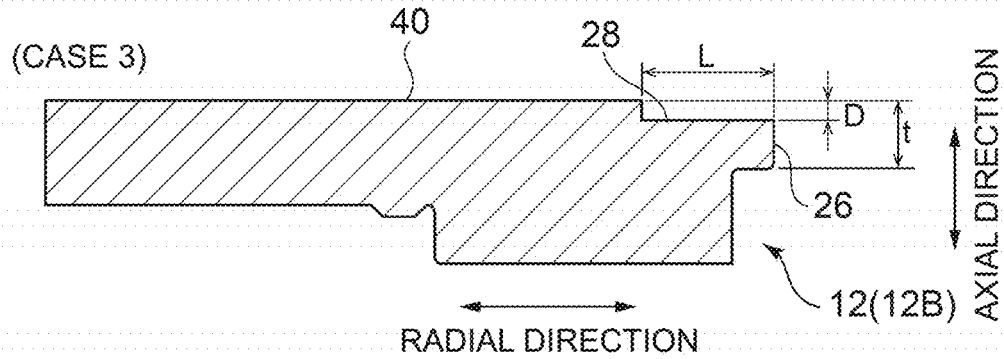
FIG. 13C is a cross-sectional view showing the formation range of a recess portion 28 of Case 3 on the first annular member 12 (12B).
Figure 13D:
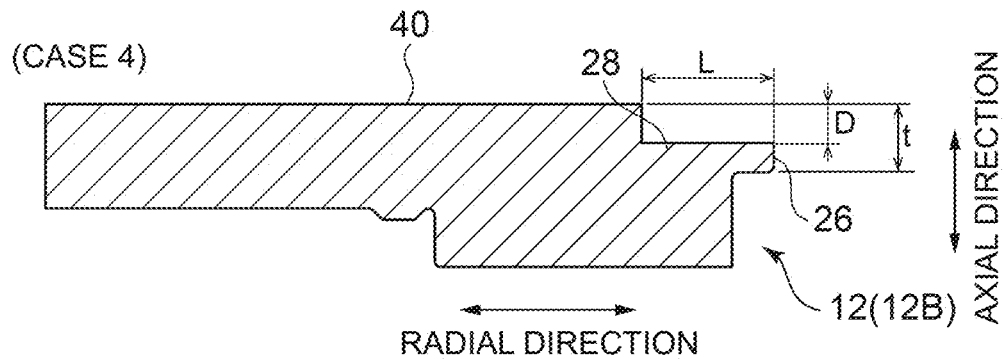
FIG. 13D is a cross-sectional view showing the formation range of a recess portion 28 of Case 4 on the first annular member 12 (12B).

FIG. 11 is a stress history chart showing the temporal change of stress generated at the same location Q (see FIGS. 10 and 21) of a first inner edge portion 26a, for a typical example shown in FIG. 21 and the like and the embodiment (the first annular member 12 (12A) with the recess portion 28). FIG. 11 shows the temporal change of the above stress in a period from heating transition (e.g. when the exhaust gas temperature and the exhaust gas flow rate of the exhaust gas flow passage increase due to an increase in the engine output) to cooling transition (e.g. when the exhaust gas temperature and the exhaust gas flow rate of the exhaust gas flow passage decrease due to a decrease in the engine output).

As shown in FIG. 11, at the time of heating transition of the first annular member, a negative stress is generated in the inner peripheral edge 26 (i.e., a compression stress is generated in the first inner edge portion 26a), and at the time of cooling transition, a positive stress is generated (a tension stress is generated in the first inner edge portion 26a). As shown in FIG. 11, according to an embodiment, it is possible to narrow the stress range S, which is a difference between the maximum and the minimum of stress at the same location Q belonging to the first inner edge portion 26a, as compared to a typical case. Accordingly, it is possible to extend the fatigue lifetime of the first inner edge portion 26a, and to suppress generation of such a fatigue crack that penetrates from the inner peripheral edge 26 to a support hole 30.

According to the result of analysis by the present inventors, by analyzing the stress range S and the fatigue lifetime X for the above location Q (see FIG. 10), it was confirmed that the stress range S can be narrowed by approximately 10% and the fatigue lifetime can be multiplied by 1.4.

Next, the result of analysis on thermal stress generated in the first annular member 12 (12B) during operation of the turbocharger 100 will now be described.

FIG. 12 is a stress distribution diagram showing an example of thermal stress generated in the first annular member 12 (12B) on cooling transition of the first annular member 12 (12B) (e.g. when the exhaust gas temperature and the exhaust gas flow rate of the exhaust gas flow passage 24 decrease due to a decrease in the engine output).

As shown in FIG. 12, stress concentrates to the recess portions 28 in the first annular member 12 (12B), and thus it is possible to reduce thermal stress in the first inner edge portions 26a in the angular range A in which the support holes 30 exist, as compared to a typical configuration shown in FIG. 21. Accordingly, it is possible to suppress generation of such a fatigue crack that penetrates from the inner peripheral edge 26 to a support hole 30 effectively.

Furthermore, as shown in FIGS. 13A to 13D, the present inventors calculated the stress range S, which is a difference between the maximum and the minimum of stress at the same location Q belonging to the first inner edge portion 26a, and the fatigue lifetime X, for four cases in which the length L of the recess portion 28 in the radial direction of the turbine rotor 2 and the depth D of the recess portion in the axial direction of the turbine rotor 2 are different. Chart 1 shows the stress range S and the fatigue lifetime X calculated in Cases 1 to 4.

CHART 1

|  | Stress range S | Fatigue lifetime X |
| --- | --- | --- |
| Typical example | 1.0 | 1.0 |
| Case 1 | 0.9 | 1.3 |
| Case 2 | 0.8 | 2.0 |
| Case 3 | 0.9 | 1.4 |
| Case 4 | 0.7 | 3.2 |

As shown in Chart 1, in all of the cases, the stress range S is smaller and the fatigue lifetime X is longer than those in the typical example (see FIG. 21). Furthermore, in Case 2 and Case 4 (in which each of the recess portions 28 is formed over the range D of not less than 60% of the thickness t of the annular protruding portion 42 in the axial direction of the turbine rotor 2), it is possible to enhance in particular the effect to narrow the stress range S and extend the fatigue lifetime X.

The present invention is not limited to the embodiments described above, and may include various modifications of the above embodiments and combinations of the same.

Figure 14:
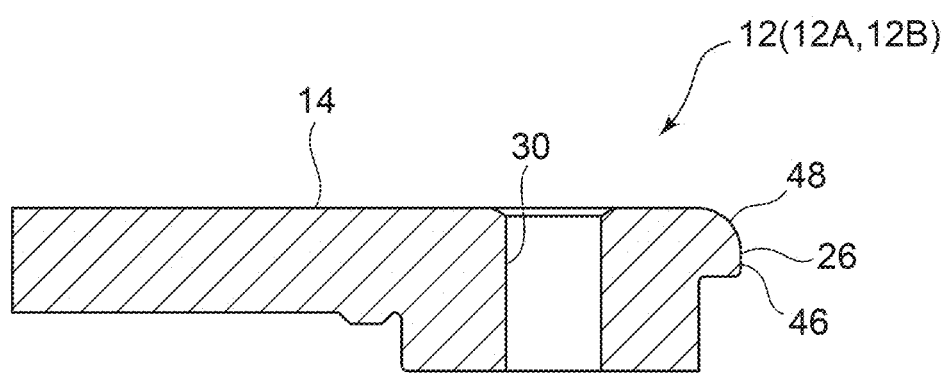
FIG. 14 is a diagram showing an example of a cross-sectional configuration of the first annular member 12 (12A, 12B).
Figure 15:
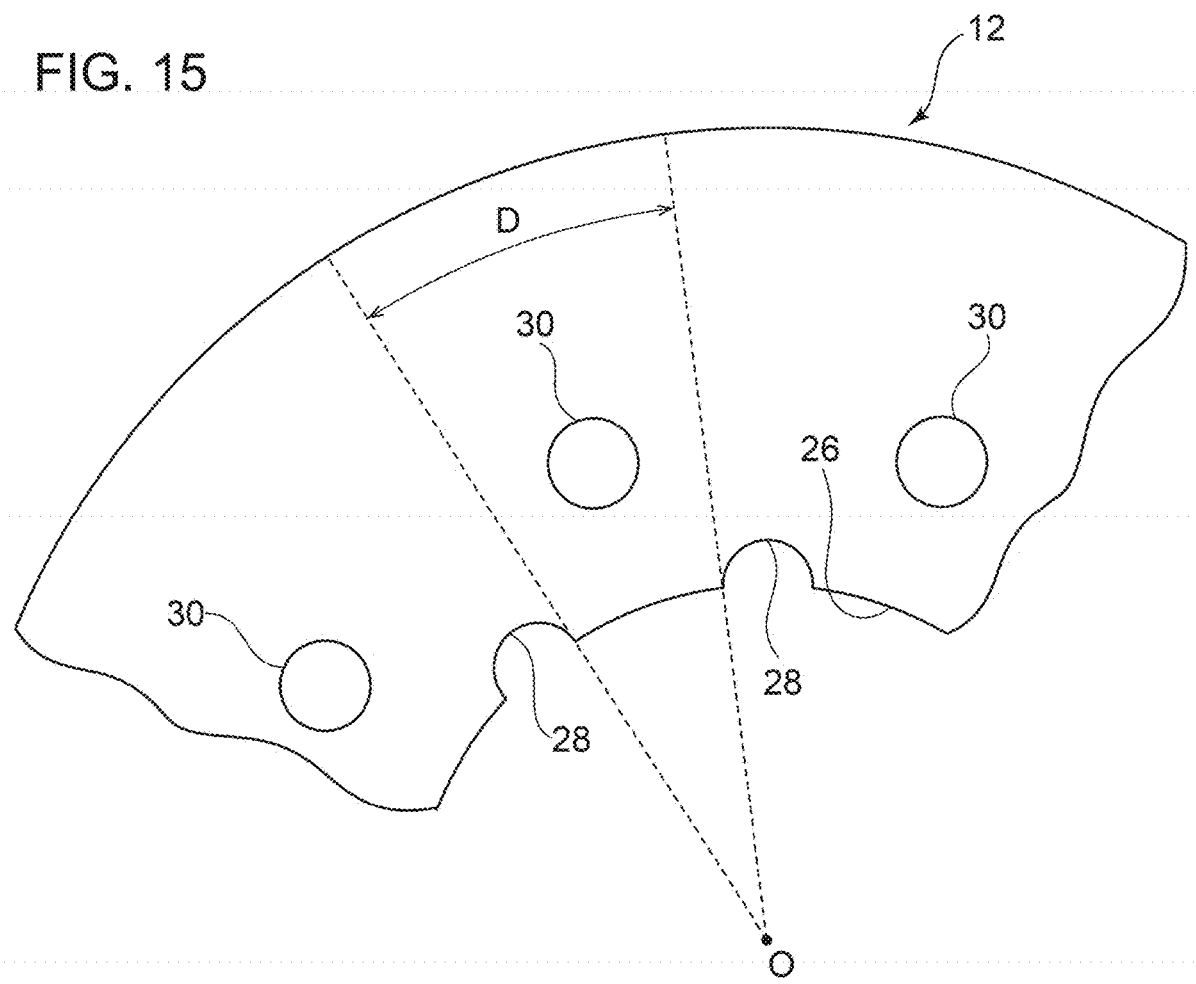
FIG. 15 is a diagram for describing the angular range D in the circumferential direction of a turbine rotor 2.

For instance, as shown in FIG. 14, of the inner peripheral edge 26, a connection portion 48 between a surface 40 of the first annular member 12 (12A, 12B) facing the second annular member 14 and an inner peripheral surface 46 of the first annular member 12 may have an R shape in the angular range D (see FIG. 15) in which the recess portions 28 do not exist in the circumferential direction of the turbine rotor 2.

With such a configuration, it is possible to reduce stress generated in a portion belonging to the angular range D of the inner peripheral edge 26 by providing the R shape, and thus it is possible to suppress generation of a fatigue crack from the inner peripheral edge 26.

Furthermore, in the above described first annular member 12 (12A, 12B), a recess portion 28 is formed on each of the second inner edge portions 26b. However, the present invention is not limited to this embodiment, and the recess portions 28 may be formed only on particular second inner edge portions 26b of the plurality of second inner edge portions 26b. For instance, as shown in FIG. 16, the inner peripheral edge 26 may have only one recess portion 28.

Figure 17A:
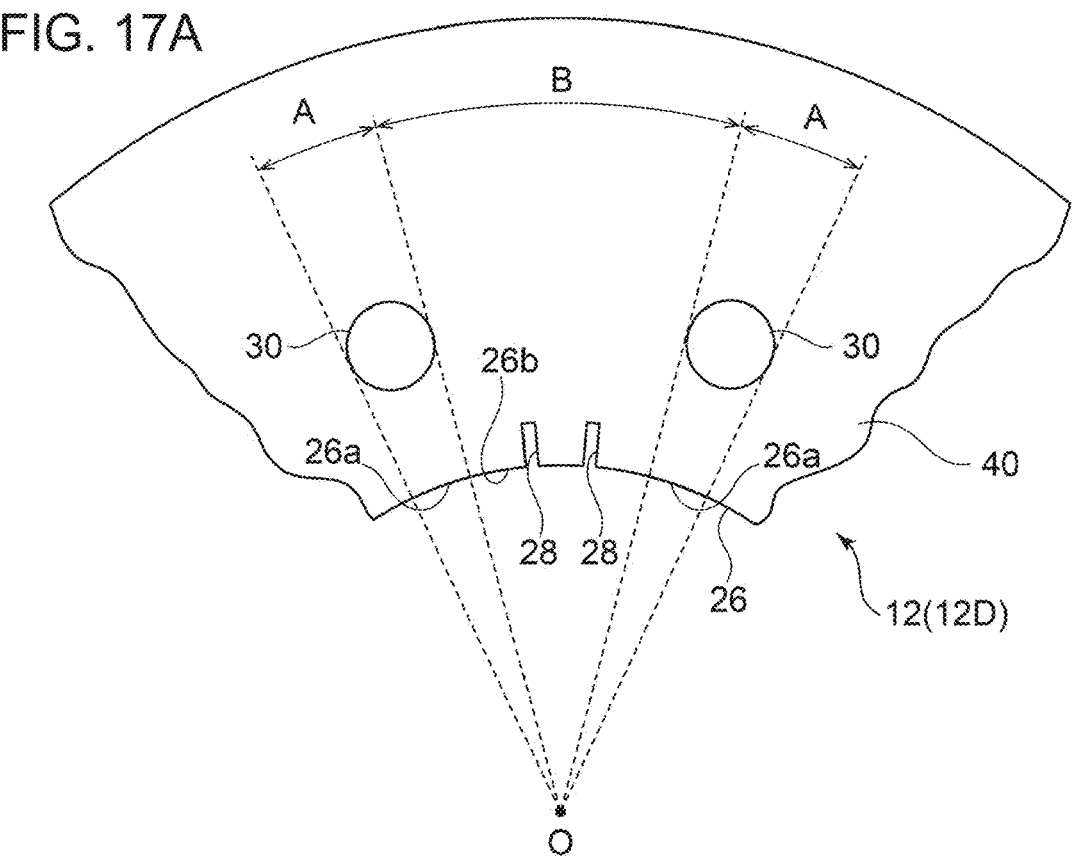
FIG. 17A is a partial diagram of the first annular member 12 (12Da) according to an embodiment, as seen in the axial direction of a turbine rotor 2 from the side of an exhaust gas flow passage 24.
Figure 17B:
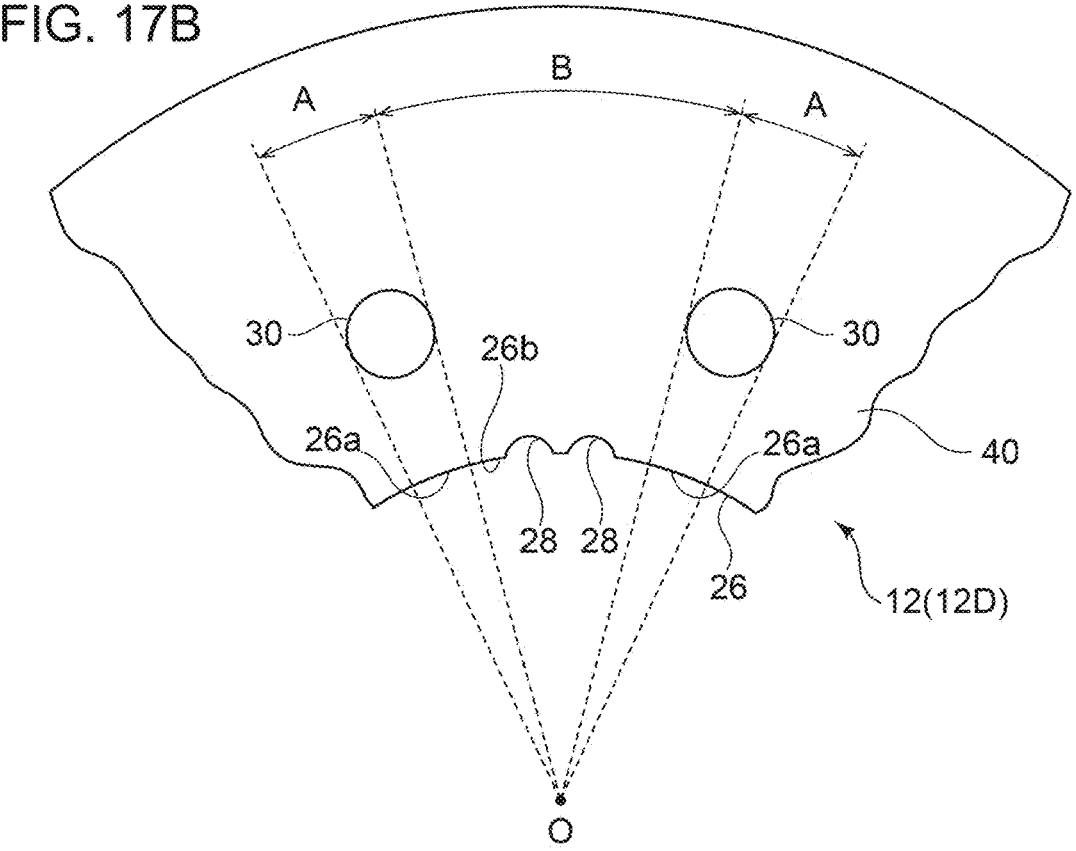
FIG. 17B is a partial diagram of the first annular member 12 (12Db) according to an embodiment, as seen in the axial direction of a turbine rotor 2 from the side of an exhaust gas flow passage 24.
Figure 19:
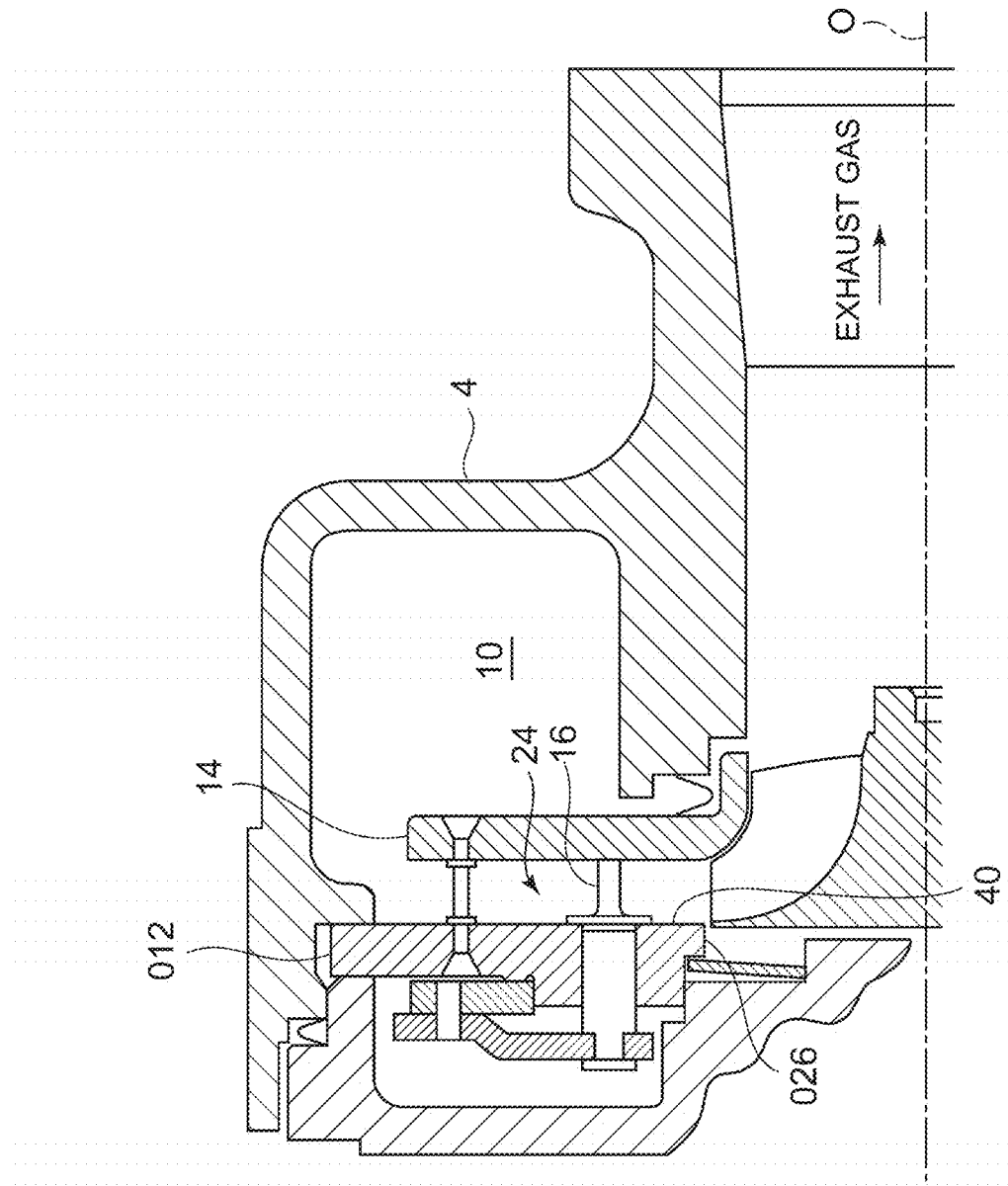
FIG. 19 is a partial schematic diagram of a cross section, taken along a rotational axis, of a typical variable geometry turbocharger.
Figure 20:
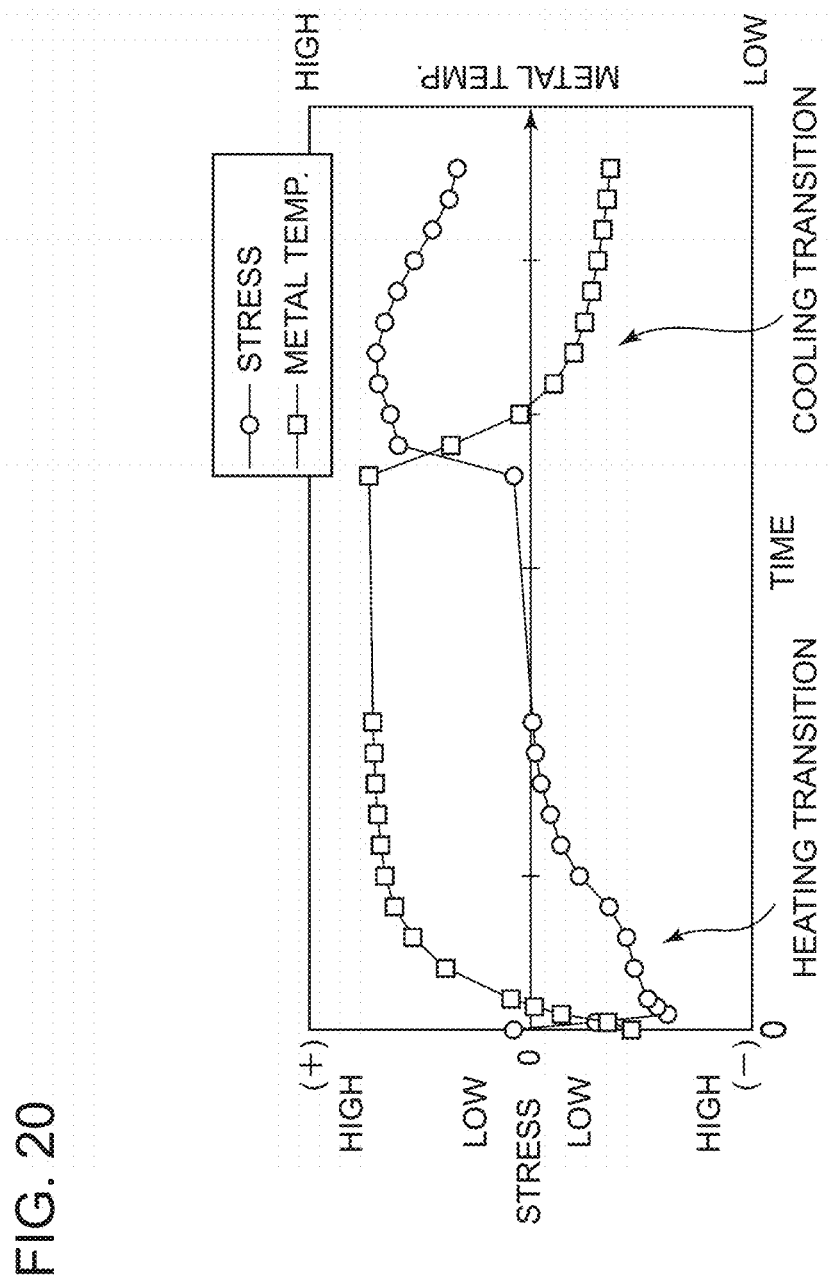
FIG. 20 is a diagram showing an example of stress distribution of an inner peripheral edge 026 of a first annular member 012 at the time of cooling transition of the first annular member 012.

Furthermore, in the above described first annular member 12 (12A, 12B), only one recess portion 28 is formed on each of the second inner edge portions 26b. That is, the number of the second inner edge portions (number of support holes 30) is equal to the number of the recess portions 28. However, the present invention is not limited to this, and the number of the recess portions 28 formed on each of the second inner edge portions 26b may be two as shown in FIGS. 17A and 17B for instance, or three or more.

Furthermore, in the above described first annular member 12 (12A), each of the recess portions 28 having an arc shape is formed to penetrate through the first annular member 12 (12A) in the axial direction of the turbine rotor 2. However, each of the recess portions 28 having an arc shape may not necessarily penetrate through the first annular member 12 in the axial direction of the turbine rotor 2. In this case, as described above regarding the first annular member 12 (12B), each of the recess portions 28 is formed over the range of not less than 60% of the thickness of the annular protruding portion 42 in the axial direction of the turbine rotor 2.

Furthermore, in the above described first annular member 12 (12B), each of the recess portions 28 having a linear shape is formed not to penetrate through the first annular member 12 (12A) in the axial direction of the turbine rotor 2. However, each of the recess portions 28 having a linear shape may penetrate through the first annular member 12 (12B) in the axial direction of the turbine rotor 2.

Furthermore, the first annular member 12 may have a configuration like that of the first annular member 12 (12E) shown in FIG. 18, for instance. In the first annular member 12 (12E) shown in FIG. 18, the inner peripheral edge 26 includes recess portions 28 curved so as to be recessed outward in the radial direction of the turbine rotor 2, and protruding portions 44 connecting smoothly to the recess portions 28 and curved so as to protrude inward in the radial direction of the turbine rotor 2. The recess portions 28 and the protruding portions 44 are formed alternately. Furthermore, one recess portion 28 is formed on each of the plurality of second inner edge portions 26b.

With such a configuration, it is possible to reduce thermal stress in each of the plurality of first inner edge portions 26a, and to suppress generation of such a fatigue crack that penetrates from the inner peripheral edge 26 to a support hole 30 effectively. Furthermore, since the recess portions 28 curved so as to be recessed outward in the radial direction and the protruding portions 44 curved so as to protrude inward in the radial direction are connected smoothly, the connection between the recess portions 28 and parts other than the recess portions 28 is not structurally weak, but has a high durability. The first annular member 12 (12E) having such a shape can be easily produced by casting, for instance.

DESCRIPTION OF REFERENCE NUMERALS

2 Turbine rotor
4 Turbine casing
6 Bearing casing
8 Variable nozzle mechanism
10 Scroll flow passage
12 First annular member
14 Second annular member
16 Nozzle vane
   16a Shaft portion
18 Lever plate
20 Drive ring
22 Nozzle support
23 Back plate
24 Exhaust gas flow passage
26 Inner peripheral edge
   26a First inner edge portion
   26b Second inner edge portion
28 Recess portion
30 Support hole
32 Hub-side wall
34 Shroud-side wall
36, 38 Through hole
40 Surface
42 Annular protruding portion
44 Protruding portion
46 Inner peripheral surface
48 Connection portion
100 Variable geometry turbocharger
A, B, C, D Angular range
Cr Crack
O Rotational axis
P Center position
Q Location
S Stress range
X Fatigue lifetime

The invention claimed is:

1. A variable nozzle mechanism for a variable geometry turbocharger, comprising:
   a first annular member;
   a second annular member disposed so as to face the first annular member and forming an exhaust gas flow passage having an annular shape between the first annular member and the second annular member, for guiding exhaust gas to a turbine rotor of the turbocharger from a scroll flow passage formed on a radially outer side of the turbine rotor; and
   a plurality of nozzle vanes supported rotatably on the first annular member and configured to be capable of adjusting a flow passage area of the exhaust gas flow passage,
   wherein the first annular member has a plurality of support holes for supporting the plurality of nozzle vanes rotatably, the support holes being disposed at intervals in a circumferential direction of the turbine rotor, wherein an inner peripheral edge of the first annular member includes a plurality of first inner edge portions belonging to an angular range in which the support holes exist in the circumferential direction of the turbine rotor and a plurality of second inner edge portions belonging to an angular range in which the support holes do not exist in the circumferential direction of the turbine rotor, and wherein at least one second inner edge portion of the plurality of second inner edge portions comprises a recess portion recessed outward in a radial direction of the turbine rotor, the recess portion extending in an axial direction of the turbine rotor from a surface defining the exhaust gas flow passage.

2. The variable nozzle mechanism according to claim 1, wherein the recess portion is formed at a center position of the angular range in which the support holes do not exist in the circumferential direction of the turbine rotor.

3. The variable nozzle mechanism according to claim 1, wherein the recess portion is formed to have an arc shape as seen in the axial direction of the turbine rotor.

4. The variable nozzle mechanism according to claim 1, wherein the recess portion is formed to have a linear shape as seen in the axial direction of the turbine rotor.

5. The variable nozzle mechanism according to claim 1, wherein the inner peripheral edge has an annular protruding portion protruding inward in the radial direction of the turbine rotor, on the side of the exhaust gas flow passage, and wherein the recess portion is formed on the annular protruding portion.

6. The variable nozzle mechanism according to claim 5, wherein the recess portion is formed over a range of not less than 60% of a thickness of the annular protruding portion in the axial direction of the turbine rotor.

7. The variable nozzle mechanism according to claim 1, wherein the recess portion is formed so as to penetrate through the first annular member in the axial direction of the turbine rotor.

8. The variable nozzle mechanism according to claim 1, wherein, of the inner peripheral edge, a connection portion between a surface of the first annular member facing the second annular member and an inner peripheral surface of the first annular member has a rounded shape in an angular range in which the recess portion does not exist in the circumferential direction of the turbine rotor.

9. The variable nozzle mechanism according to claim 1, wherein each of the plurality of second inner edge portions has a recess portion formed thereon, the recess portion being recessed outward in the radial direction of the turbine rotor.

10. The variable nozzle mechanism according to claim 1, wherein the inner peripheral edge has recess portions curved so as to be recessed outward in the radial direction of the turbine rotor and protruding portions connecting to the curved recess portions smoothly and curved so as to protrude inward in the radial direction of the turbine rotor, the recess portions and the protruding portions being formed alternately, and wherein each of the second inner edge portions has one of the recess portions.

11. A variable geometry turbocharger, comprising:
the turbine rotor;
a turbine casing housing the turbine rotor and forming a scroll flow passage into which exhaust gas from an engine flows; and
the variable nozzle mechanism according to claim 1,
wherein exhaust gas passes through the scroll flow passage and then is supplied to the turbine rotor via the variable nozzle mechanism.

12. The variable nozzle mechanism according to claim 1, wherein the recess portion is disposed next to the exhaust gas flow passage.

13. The variable nozzle mechanism according to claim 1, wherein the first annular member is an annular plate disposed on the radially outer side of the turbine rotor.

14. A variable nozzle mechanism for a variable geometry turbocharger, comprising:
a first annular member;
a second annular member disposed so as to face the first annular member and forming an exhaust gas flow passage having an annular shape between the first annular member and the second annular member, for guiding exhaust gas to a turbine rotor of the turbo charger from a scroll flow passage formed on a radially outer side of the turbine rotor; and
a plurality of nozzle vanes supported rotatably on the first annular member and configured to be capable of adjusting a flow passage area of the exhaust gas flow passage,
wherein the first annular member has a plurality of support holes for supporting the plurality of nozzle vanes rotatably, the support holes being disposed at intervals in a circumferential direction of the turbine rotor,
wherein an inner peripheral edge of the first annular member includes a first inner peripheral edge having a first inner diameter that engages a casing of the variable geometry turbocharger and a second inner peripheral edge having a second inner diameter smaller than the first inner diameter, and the second inner peripheral edge includes a plurality of first inner edge portions belonging to an angular range in which the support holes exist in the circumferential direction of the turbine rotor and a plurality of second inner edge portions belonging to an angular range in which the support holes do not exist in the circumferential direction of the turbine rotor, and
wherein at least one second inner edge portion of the plurality of second inner edge portions comprises a recess portion recessed outward in a radial direction of the turbine rotor, the recess portion extending in an axial direction of the turbine rotor from the side of the exhaust gas flow passage.

* * * * *